United States Patent
Tibble

(10) Patent No.: US 9,378,013 B2
(45) Date of Patent: Jun. 28, 2016

(54) INCREMENTAL SOURCE CODE ANALYSIS

(71) Applicant: SEMMLE LIMITED, Oxford (GB)

(72) Inventor: Julian Tibble, Oxford (GB)

(73) Assignee: Semmle Limited

(*) Notice: Subject to any disclaimer, the term of this patent is extended or adjusted under 35 U.S.C. 154(b) by 0 days.

(21) Appl. No.: 14/941,101

(22) Filed: Nov. 13, 2015

(65) Prior Publication Data

US 2016/0139917 A1 May 19, 2016

Related U.S. Application Data

(60) Provisional application No. 62/080,182, filed on Nov. 14, 2014.

(51) Int. Cl.
G06F 9/45 (2006.01)
G06F 9/44 (2006.01)

(52) U.S. Cl.
CPC .................................. *G06F 8/75* (2013.01)

(58) Field of Classification Search
None
See application file for complete search history.

(56) References Cited

U.S. PATENT DOCUMENTS

| | | | | |
|---|---|---|---|---|
| 5,778,212 A * | 7/1998 | Dehnert | .................. | G06F 8/443 717/146 |
| 6,029,002 A * | 2/2000 | Afifi | ...................... | G06F 8/433 714/E11.209 |
| 8,898,623 B2 | 11/2014 | Zhao | .......................... | 717/105 |
| 9,208,056 B1 * | 12/2015 | Henriksen | ........... | G06F 11/3604 |
| 2005/0015752 A1 * | 1/2005 | Alpern | ................ | G06F 11/3604 717/131 |
| 2007/0016898 A1 * | 1/2007 | Derby | ................. | G06F 11/3604 717/144 |
| 2007/0169036 A1 * | 7/2007 | Garner | .................... | G06F 8/437 717/143 |
| 2007/0174817 A1 * | 7/2007 | Fanning | .............. | G06F 11/3688 717/124 |
| 2007/0180429 A1 * | 8/2007 | Gogh | .................. | G06F 11/3604 717/126 |
| 2007/0288899 A1 | 12/2007 | Fanning et al. | | |
| 2008/0028380 A1 * | 1/2008 | Guo | ........................ | G06F 8/433 717/151 |
| 2010/0100867 A1 * | 4/2010 | Sindhgatta | ................ | G06F 8/75 717/105 |
| 2011/0225571 A1 * | 9/2011 | Stanford-Jason | ... | G06F 11/3604 717/145 |
| 2012/0054724 A1 * | 3/2012 | Kalman | .............. | G06F 11/3604 717/131 |
| 2012/0079447 A1 * | 3/2012 | Arnott | ...................... | G06F 8/71 717/101 |
| 2012/0304153 A1 * | 11/2012 | Li | ............................. | G06F 8/75 717/123 |

(Continued)

OTHER PUBLICATIONS

Extended European Search Report issued in European Application No. 15194456.8 on Apr. 8, 2016, 8 pages.

*Primary Examiner* — Isaac T Tecklu
(74) *Attorney, Agent, or Firm* — Fish & Richardson P.C.

(57) ABSTRACT

Methods, systems, and apparatus, including computer programs encoded on computer storage media, for generating a full set of analysis artifacts after incremental analysis of a source code base. One of the methods includes receiving a first full set of analysis artifacts and an incremental set of analysis artifacts for a project. An initial keep graph that is initially equivalent to the full build graph is generated. Any source code file or analysis artifact nodes that also occur in the incremental build graph are removed from the keep graph. Analysis artifacts for source code files in the full build graph that do not occur in the keep graph are deleted from the first full set of analysis artifacts. The analysis artifacts represented by nodes in the incremental build graph are copied into the first full set of analysis artifacts to generate a second full set of analysis artifacts for the project.

28 Claims, 29 Drawing Sheets

(56) References Cited

U.S. PATENT DOCUMENTS

| | | |
|---|---|---|
| 2013/0326481 A1 | 12/2013 | Kannan |
| 2014/0013304 A1* | 1/2014 | Vangala ................... G06F 8/75 717/123 |
| 2014/0306964 A1* | 10/2014 | Reddish ................. G06F 8/433 345/440 |
| 2014/0337820 A1* | 11/2014 | Km .......................... G06F 8/73 717/123 |
| 2014/0380290 A1* | 12/2014 | Auerbach ............... G06F 8/443 717/156 |
| 2015/0121533 A1* | 4/2015 | Gluck ................... G06F 21/577 726/25 |
| 2015/0309790 A1* | 10/2015 | Henriksen ................ G06F 8/77 717/121 |
| 2015/0378697 A1* | 12/2015 | Sathyanathan ........... G06F 8/41 717/146 |

\* cited by examiner

INCREMENTAL SOURCE CODE ANALYSIS

BACKGROUND

This specification relates to static analysis of computer software source code.

Static analysis refers to techniques for analyzing computer software source code without executing the source code as a computer software program.

Source code is typically maintained by developers in a code base of source code using a version control system. Version control systems generally maintain multiple revisions of the source code in the code base, each revision being referred to as a snapshot. Each snapshot is a view of the source code of files of the code base as the files existed at a particular point in time. A snapshot may be thought of as including all the source code as of the point in time.

Source code in a code base is typically compiled in a build environment maintained by a build system. The build environment includes an operating system; a file system; executable files, e.g., compilers; environment variables, e.g., variables that indicate a path to file system directories that contain source code files or executable files; and other configuration files for building source code in the code base.

Many compilers have a preprocessor that runs before the compiler is called. Preprocessors can make arbitrary textual substitutions in existing source code files before the compiler is called to compile the modified source code. Preprocessors can also generate temporary source code files that are compiled but then deleted by the build system when compilation is complete.

In addition, build utilities, e.g., the "make" utility on Linux and Unix operating systems, can be programmed to copy source code files from one place to another during the build process. For example, a build utility can copy a file from one location to another for compilation because another source code file may include or depend on the copied file. The copied file may then be deleted by the build system after compilation is complete.

In these situations, merely having read access to the source code files in a file system is insufficient for a static analysis system to extract all the source code that is built by a build system.

SUMMARY

This specification describes a static analysis system that can generate a full set of analysis artifacts using an incremental set of analysis artifacts generated from an incremental build. In doing so, a static analysis system can effectively generate a new full set of analysis artifacts from one previous full build and from incremental analysis artifacts generated from any arbitrarily long sequence of incremental builds.

Particular embodiments of the subject matter described in this specification can be implemented so as to realize one or more of the following advantages. A static analysis system can extract exactly the source code that is compiled by a build system without having to analyze, replicate, or emulate the behavior of the build system. The static analysis system can intercept compiler calls using a shared library without modifying, recompiling, or relinking any of the build utilities or compilers used to compile the source code. The shared library also has a minimal impact on the speed of the build system. Furthermore, the environment of the build system need not be modified to extract the source code nor do any system calls of the operating system need to be modified. The static analysis system tools can run in user process space of an operating system and can extract the source code without having administrative privileges. Invoking the extractor in library initialization code that is run before the main routine of the compiler is called can allow the system to safely allocate heap memory as the extractor is being invoked. Invoking the extractor in library initialization code also allows the system to load custom signal handlers. A system can generate a full set of analysis artifacts by generating only incremental analysis artifacts from an incremental build. The full set of analysis artifacts will be equivalent to a set of analysis artifacts that would have been generated by rebuilding all the source code in the project. This saves users of the system the time and trouble of having to rebuild the entire source code base for static analysis when only a relatively small number of source code files have changed.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A static analysis system can perform more correct and more comprehensive static analysis of source code when the static analysis system has access to precisely the source code that is compiled by a build system.

A static analysis system can obtain exactly the source code that is compiled by a build system by intercepting requests by the build system to create new compiler processes. The static analysis system can modify the build environment so that when a script or build utility of the build system creates a new process, the request is handled by a function defined in a custom library rather than by a default process creation function of the operating system. The custom library will be referred to as a "process interception library," because it includes functions that preempt default process creation functions in order to intercept requests by a build system to create new processes.

The custom create-process function receives all of the arguments and environment variables that the compiler process will use to compile source code. If the process being created is a compiler, the custom create-process function can then pass these intercepted arguments and environment variables to a source code extractor for extracting precisely the source code that the compiler is compiling.

Figure 1:
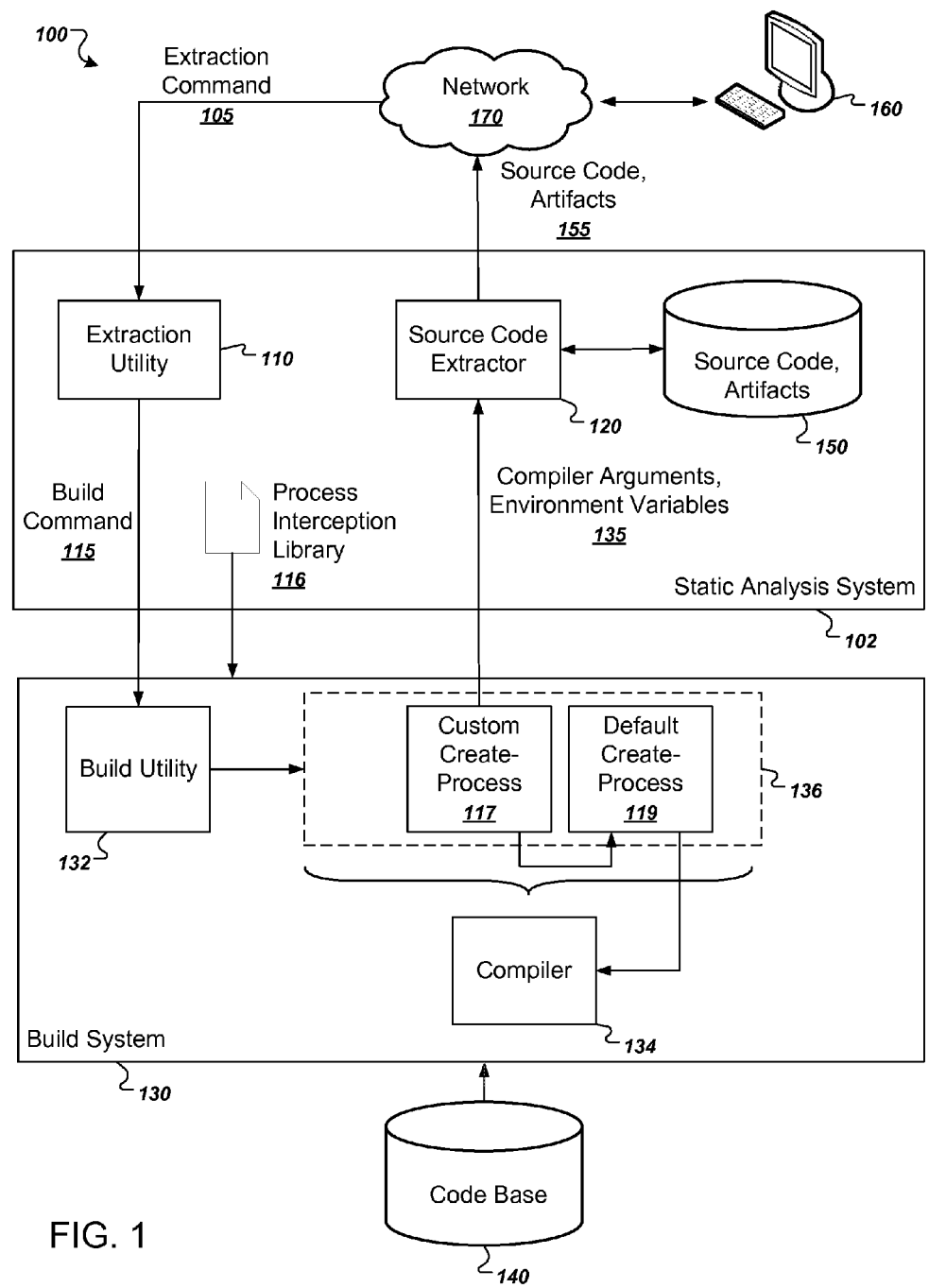
FIG. 1 illustrates an example system.

FIG. 1 illustrates an example system. The system 100 includes a user device 160 in communication with a static analysis system 102 over a network, 170, which can be any appropriate communications network. The static analysis system 102 includes an extraction utility 110 and a source code extractor 120. The components of the static analysis system 102 can be implemented as computer programs installed on one or more computers in one or more locations that are coupled to each through a network. Alternatively, the static analysis system 102 can be installed in whole or in part on a single computing device, e.g., the user device 160.

The static analysis system 102 is in communication with a build system 130. The static analysis system 102 and the build system 130 can be installed on different computing devices that are in communication with one another, e.g., using the network 170, or the static analysis system 102 and the build system 130 can be installed on a same computing device.

The build system 130 generally builds source code in a code base 140. The build system 130 includes a build utility 132 and a compiler 134, both of which can be conventional components for building and compiling source code. For example, the build utility 132 can be the "make" utility, for Linux and Unix systems, or the build utility 132 can be a batch script that coordinates compiling of source code in the code base 140.

The compiler 134 can be any appropriate compiler for compiling source code in the code base 140. For example, the compiler 134 can be the gcc compiler. (The gcc compiler is available from the Free Software Foundation, http://directory.fsf.org/wiki/Gcc.) The build system may also have multiple different compilers for compiling source code in different languages of the code base 140, for compiling source code in different modes, or for compiling source code for different target architectures.

The static analysis system 102 provides a process interception library 116 to the build system 130. The process interception library 116 will be loaded by new processes on the build system 130 that are created during the build process.

A user of the user device 160 can provide an extraction command 105 to the extraction utility 110 of the static analysis system 102. The extraction command 105 is a request to extract precisely the source code that the compiler 134 of the build system 130 is compiling.

The extraction utility 110 provides a build command 115 to the build system 130. The build command 115 causes the build system 130 to execute the build utility 132 and causes the build utility 132 to load the process interception library 116.

Loading the process interception library 116 by the build utility 132 of the build system 130 has two effects. First, every new process invoked from the build utility 132 in the build system 130 will also load the process interception library 116. Second, every new process in the build system 130 will have its default process creation functions preempted by custom process creation functions defined in the process interception library 116.

In performing a build of the code base 140, the build utility 132 will invoke the compiler 134 to compile source code files. To do so, the build utility 132, generates a new compiler process 136 that will execute by loading an executable file of the compiler 134. The new compiler process 136 also loads the process interception library 116, causing a default create-process function 119 of the new compiler process 136 to be preempted by a custom create-process function 117 of the process interception library 116.

Thus, when the new compiler process 136 calls a create-process function to load the executable file of the compiler 134 into memory of the new compiler process 136, the new compiler process actually calls the custom create-process function 117 defined in the process interception library 116.

In general, a process is an independent execution unit that contains its own state information, uses its own address space, and only interacts with other processes by interprocess communication mechanisms, which are generally managed by an operating system. A process may include one or more threads, which are also independent execution units but which share the state information and address space of the process. A system can invoke a new process by allocating memory for the new process, loading an executable process image and one or more libraries into the memory allocated for the new process, and scheduling a new thread in the new process for execution.

In this specification, reference will be made to preempting "create-process" functions of particular operating systems. In general, the static analysis system 102 can preempt any appropriate operating system function that handles creating, initializing, modifying, or executing a new process that is being invoked. Thus, a "create-process" function need not actually allocate memory for creating a new process. For example, one appropriate default create-process function is execve on Linux, which typically loads a new process image into an existing process that was actually created by the fork command. Another appropriate default create-process function is CreateProcess on Microsoft Windows, which does allocate memory in order to invoke a new process.

A call to the custom create-process function 117 specifies the executable file of the compiler 134, one or more arguments including one or more source code files to be compiled, and one or more environment variables of the build environment. The custom create-process function 117 then passes all of these the compiler arguments and environment variables 135 to a source code extractor 120 of the static analysis system 102.

The source code extractor 120 uses the compiler arguments and environment variables 135 to access precisely the source code that will be compiled by the new compiler process 136. The source code extractor 120 will generate analysis artifacts that include information about properties of the extracted source code. These artifacts can be stored in separate files. The source code extractor 120 can store the extracted source code and analysis artifacts 155 in a collection of source code and analysis artifacts 150. The source code can be stored in its original text form or in an intermediate representation. Additionally, the source code extractor 120 can provide the source code and analysis artifacts 155 back to the user device 160 over the network 170.

When the source code extractor 120 has finished extracting the source code 155, the custom create-process function 117 resumes normal execution of the compiler process 136, e.g., by calling the default create-process function 119 of the build system 130 to load the executable file of the compiler 134 into the new compiler process 136.

In some cases, the custom create-process function 117 may cause the new compiler process 136 to run the compiler 134 before providing the source code extractor 120 with the compiler arguments and environment variables 135.

The custom create-process function 117 may also alter or add compiler arguments that are passed to the compiler. For example, the custom create-process function 117 could add optimization flags in the call to the default create-process function 119 in order to make the compiler compile source code with the optimizations specified by the optimization flags, even if the build system ordinarily would not have done so.

Figure 2:
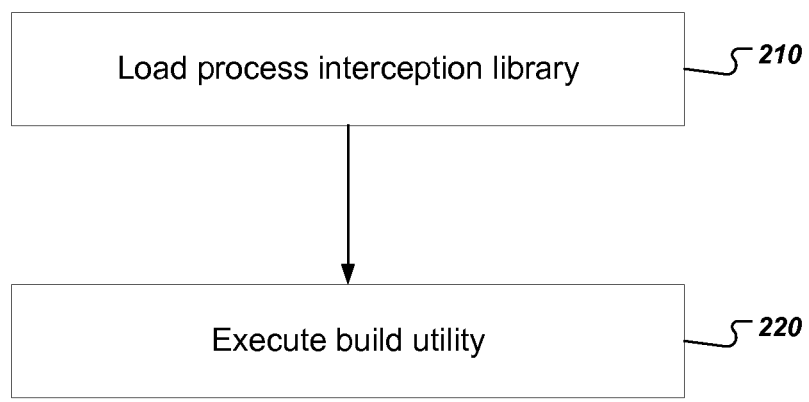
FIG. 2 is a flow chart of an example process for initiating source code extraction.

FIG. 2 is a flow chart of an example process for initiating source code extraction. In general, a static analysis system loads a process interception library and then calls a build utility of a build system. The process will be described as being performed by an appropriately programmed system of one or more computers, e.g., the extraction utility 110 of FIG. 1. The process can alternatively be performed by a user of a static analysis system. For example, a user can cause the system to perform the operations of the process by manually initiating each step of the process.

The system loads a process interception library (210). Typically, the process interception library is a shared library, sometimes referred to as a dynamically linked library. In other words, the code provided by the process interception library is loaded into memory at process load time or during process execution rather than being compiled into an executable file at compile time. By implementing the process interception library as a shared library, the static analysis system need not modify or recompile executable files of the build system.

Loading the process interception library causes a build system to execute code of a custom create-process function when a default create-process function is called. The custom create-process function will in turn cause each new child process to also load the process interception library. The procedures needed to force new processes to load the process interception library without recompiling the executable files are generally operating system-specific. Some operating systems support shared library environment variables. A shared library environment variable can specify a particular shared library that should be loaded by a new process. Thus, the system can force a new process to load the process interception library by overloading the default create-process function with a custom create-process function that ensures that a shared library environment variable includes the process interception library.

In Linux, for example, the system can set the shared library environment variable, LD_PRELOAD, which specifies one or more shared libraries that should be loaded in a new process as well as their precedence over one another. Thus, the custom create-process function can ensure that LD_PRELOAD includes the process interception library, and the new process will load the process interception library. In addition, the custom create-process function can set LD_PRELOAD to indicate that the process interception library should have precedence over other operating system libraries that may include default create-process functions.

In OS X, the system can similarly set the shared library environment variable DYLD_INSERT_LIBRARIES to include the process interception library. On OS X, the process interception library should also include an entry to the_interpose DATA section that explicitly lists overloaded create-process functions.

On Microsoft Windows, the system will generally override the functionality of a default library loader function so that when the default library loader function is called, the process also loads the process interception library. This will be described in more detail below with reference to FIG. 5D-5E.

Loading the process interception library causes the system to preempt the default create-process function with a custom create-process function. The system can preempt the default create-process function in a number of ways.

A first technique to preempt the default create-process function is for the system to overload the default create-process function by defining a custom create-process function that has a same function name as the default create-process function and which takes precedence over the default create-process function. Thus, when a process makes a call to a function having the name of the default create-process function, the custom create-process function is called instead.

A second technique to preempt the default create-process function is for the system to provide metadata to the operating system's dynamic linker that requests that the linker replace the default create-process function with the custom create-process function.

A third technique to preempt the default create-process function is for the system to override the default create-process function by modifying information about the default create-process function. For example, the system can modify an in-memory table that specifies the starting address of the default create-process function by altering the starting address to be the starting address of the custom create-process function. Overwriting an in-memory table will be described in more detail below with reference to FIG. 5.

A fourth technique to preempt the default create-process function is for the system to also overwrite the head of the default create-process function. For example, the system can overwrite the head to include an unconditional jump instruction to the custom create-process function. Overwriting the head of the default create-process function will be described in more detail below with reference to FIGS. 8-11.

The system executes a build utility (220). The build utility can be a standard build utility of the build system, e.g., the "make" utility.

The system need not modify the build utility. Yet, after the system loads the process interception library, each new process that is created will also load the process interception library and will execute the custom create-process function whenever the default process creation function is called.

Figure 3A:
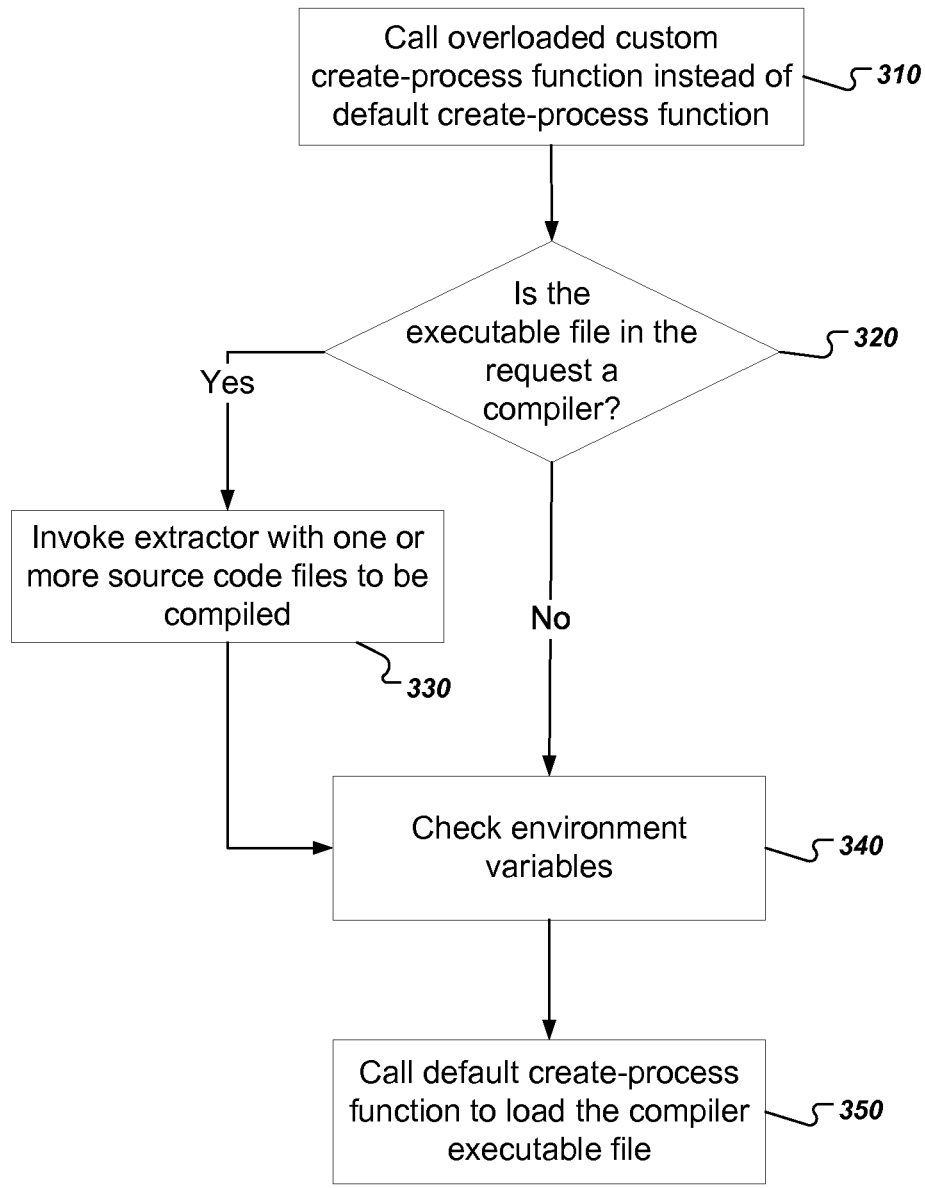
FIG. 3A is a flow chart of an example prior art process performed by a custom create-process function.

FIG. 3A is a flow chart of an example prior art process performed by a custom create-process function. The process makes use of shared library environment variables to ensure that the process interception library is loaded. The custom create-process function generally determines whether the new process is a compiler and, if so, calls a source code extractor to extract source code of the file to be compiled. The process will be described as being performed by an appropriately programmed system of one or more computers.

The system calls an overloaded custom create-process function instead of a default create-process function (310). As mentioned above, the system preempts the default create-process function so that processes execute code of a custom create-process function.

The request includes an argument that specifies the location of an executable file to execute in the new process. The request may also specify other arguments and environment variables.

In Linux and OS X systems, for example, a fork command creates a new process by making a copy of the current process. The new process then calls execve or a related process creation function. However, if the system has overloaded execve with a custom create-process function, the new process will call the custom create-process function.

The system determines whether the file is a compiler (320). The system can maintain a set of known compilers and determine whether the file is included in the set of known compilers.

The system can also use a set of pattern matching rules to determine whether the file is a compiler. For example, the rules can define any file that satisfies the regular expression "*\csc.exe" to be a compiler.

If the executable file in the request is a compiler, the system invokes an extractor with one or more source code files to be compiled (branch to 330). If the file is a compiler, one or more of the arguments specified in the request will specify the locations of source code files to be compiled. The locations of the source code files to be compiled can be specified directly or indirectly. For example, one of the arguments may specify the location of a file which includes a list of source code files to be compiled.

Before loading the compiler executable file into the new process, the system invokes a source code extractor on the source code files being compiled. The system can invoke the extractor by forking a new process and specifying the location of an executable file for the source code extractor as well as arguments that identify the source code files specified in the request to the compiler process. The system then waits for the source code extractor to exit before proceeding to load the compiler executable file into the compiler process.

The system checks environment variables (340). Some systems may clear or alter environment variables when creating new processes. Thus, the system ensures that the shared library environment variable is set so that other processes will also load the process interception library.

The system calls the default create-process function to load the compiler executable file (350). The system loads the compiler into the process by calling the default create-process function, specifying the original executable file argument as well as the other arguments that specify source code files to be compiled. After setting a shared library environment variable, calling the default process creation function will also load the process interception library into the new process.

If the executable file was not a compiler, the system will simply check that the environment variables are set correctly (branch to 340), and call the default create-process function using the executable file argument (350). For example, the newly invoked extractor process will call the custom create-process function, which will determine that the executable file is not a compiler. Thus, the custom-create process function of the extractor process will call the default create-process function to load the executable file of the extractor into the extractor process. The custom create-process function can mirror the functionality of the default create-process function by providing the same arguments in the request to the default create-process function. Thus, the functionality of the custom create-process function is transparent to all new processes. However, the new processes will also load the process interception library when they ordinarily would not have.

Figure 3B:
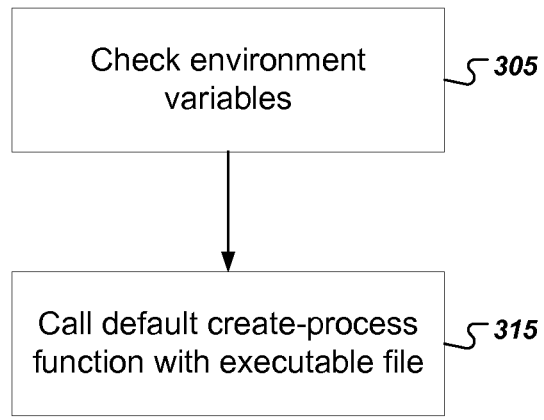
FIG. 3B is a flow chart of an example process performed by a custom create process function before the main routine of a compiler process is called.

FIG. 3B is a flow chart of an example process performed by a custom create-process function before the main routine of a compiler process is called. The process will be described as being performed by an appropriately programmed system of one or more computers.

The default create-process function illustrated in FIG. 3A is called to load the compiler process image into the new process only after the source code extractor was invoked. In some implementations, the system can instead call the default create-process function to load the compiler process image before the source code extractor is invoked. In that case, the system can invoke the extractor process from within the compiler process in library initialization code, which may also be referred to as a "library constructor," and which will be described in more detail below with reference to FIG. 3C.

Invoking the extractor in library initialization code that is run before the main routine of the compiler process is called can allow the system to safely allocate heap memory as the extractor is being invoked. Invoking the extractor in library initialization code also allows the system to load custom signal handlers. This can allow the system to better handle SIGCHLD and other signals that are sent to parent processes when a child process exits.

In this process illustrated in FIG. 3B, the custom create-process function need only check the environment variables to make sure that they are set correctly (305) and call the default process creation function (315), as described above with reference to FIG. 3A. When the shared library environment variable is set correctly, the call to the default process creation function (315) loads the process interception library into the new process.

Figure 3C:
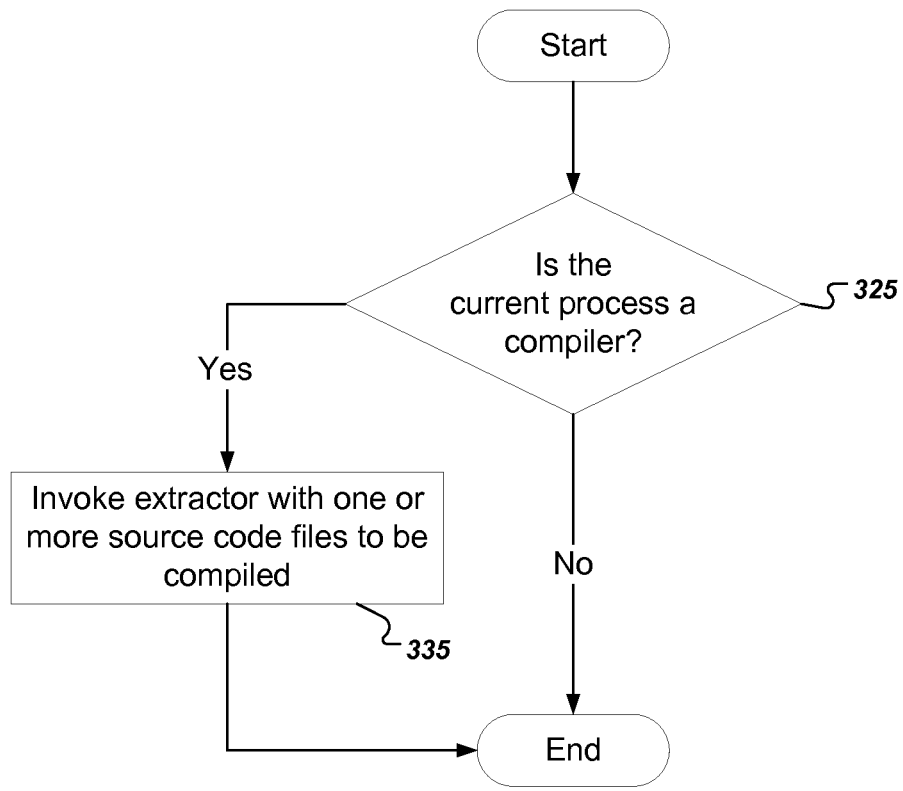
FIG. 3C is a flow chart of an example process performed by a library initialization function.

FIG. 3C is a flow chart of an example process performed by a library initialization function. The system can invoke the extractor in library initialization code of the process interception library. Library initialization code includes code that runs after a library is loaded and before the main routine of the process starts. For example, when using the gcc compiler and when targeting an appropriate architecture and executable file format, a particular function can be decorated with the "((constructor))" attribute, which causes its code to run just after the process interception library is loaded and before the main routine of the new process is executed.

Thus, the process illustrated in FIG. 3C can be performed in response to the new process loading the process interception library, as described above with reference to FIG. 3B. The process will be described as being performed by an appropriately programmed system of one or more computers.

The system determines whether the current process is a compiler (325). As described above, the system can determine whether the executable file occurs in a maintained list of compilers. Because the process is being performed in a library initialization function, the system can also optionally allocate heap memory, optionally set signal handlers, and, after the extractor exits, optionally deallocate heap memory and restore the signal handlers. If the current process is a compiler, the system invokes an extractor with one or more source code files to be compiled (branch to 335). The system typically also passes the compiler arguments and environment variables as well. In some implementations, the system waits for the source code extractor to exit before proceeding.

If the current process is not a compiler, the custom library initialization code ends and the newly created process proceeds normally.

Figure 3D:
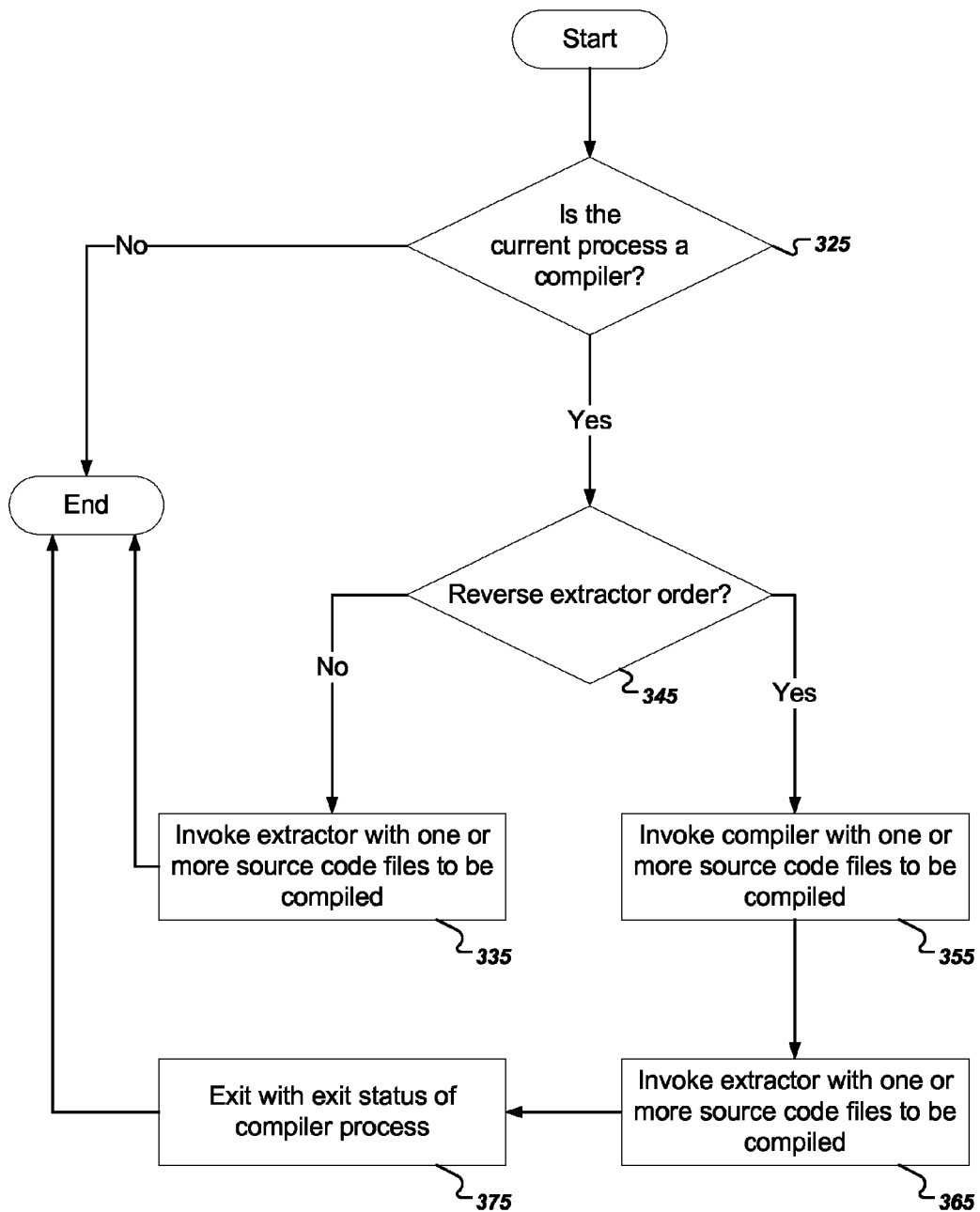
FIG. 3D is a flow chart of an example process for calling an extractor after the compiler.

FIG. 3D is a flow chart of an example process for calling an extractor after the compiler. The process illustrated in FIG. 3C illustrates the extractor being called before the compiler. On Linux and OS X systems, the system can reverse this order and call the compiler before the extractor in library initialization code of the process interception library. The process will be described as being performed by an appropriately programmed system of one or more computers.

The system determines whether the current process is a compiler (325), for example, in library initialization code as described above with reference to FIG. 3C.

The system determines whether to reverse the extractor order (345). The system can check system configuration settings or user preference settings to determine whether the order of the extractor and the compiler should be reversed.

If the order is not reversed, the system invokes an extractor with one or more source code files to be compiled (branch to 335), as described above with reference to FIG. 3C.

If the order is reversed, the system invokes a compiler with one or more source code files to be compiled (branch to 355). For example, the system can call a fork command and the default execve function to invoke a compiler process. The system can then wait for the compiler process to end.

The system invokes an extractor with one or more source code files to be compiled (365). The system can similarly call a fork command and the default execve function to invoke the extractor using the source code files to be compiled. The extractor will generally also have access to the files that have already been compiled by the compiler.

The system exits with the exit status of the compiler process (375). In order to make the extraction of the source code transparent to the build system, the system can provide the compiler's exit status to the parent process. Thus, if the compiler exited with errors, the parent process can respond accordingly.

Reversing the order of the extractor and the compiler for Windows-based systems will be described below with reference to FIG. 12.

Figure 4:
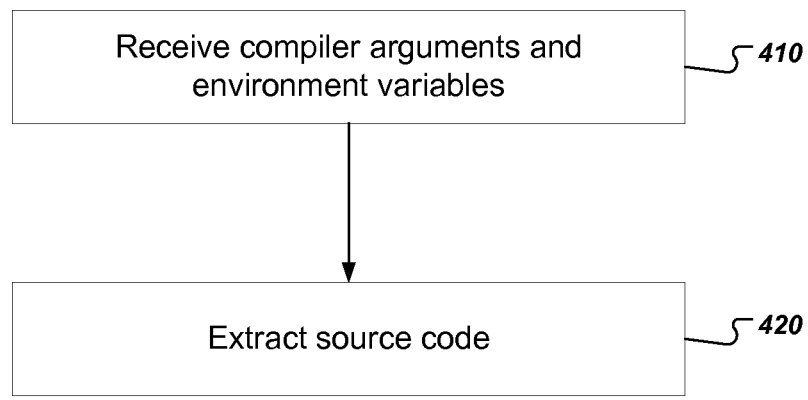
FIG. 4 is a flow chart of an example process for extracting source code.

FIG. 4 is a flow chart of an example process for extracting source code. The process can be performed by a source code extractor, e.g., the source code extractor 120 of FIG. 1. The process will be described as being performed by an appropriately programmed system of one or more computers.

The system receives compiler arguments and environment variables (410). The compiler arguments generally specify the source code files to be compiled as well as any command line arguments of the compiler. The system may also make use of the environment variables to in order to access the source code files. For example, the environment variables may specify a path to the location of the source code files.

The system extracts source code (420). The system accesses the files and can store a copy of the source code files in a particular location. The system can also generate an intermediate representation of the source code in the source code files, which can be used to generate a database that represents source code in the project.

If the extractor is called after the compiler, as described above, the system can also receive the output of the compilation process, e.g., compiled object files and executable files.

Figure 5A:
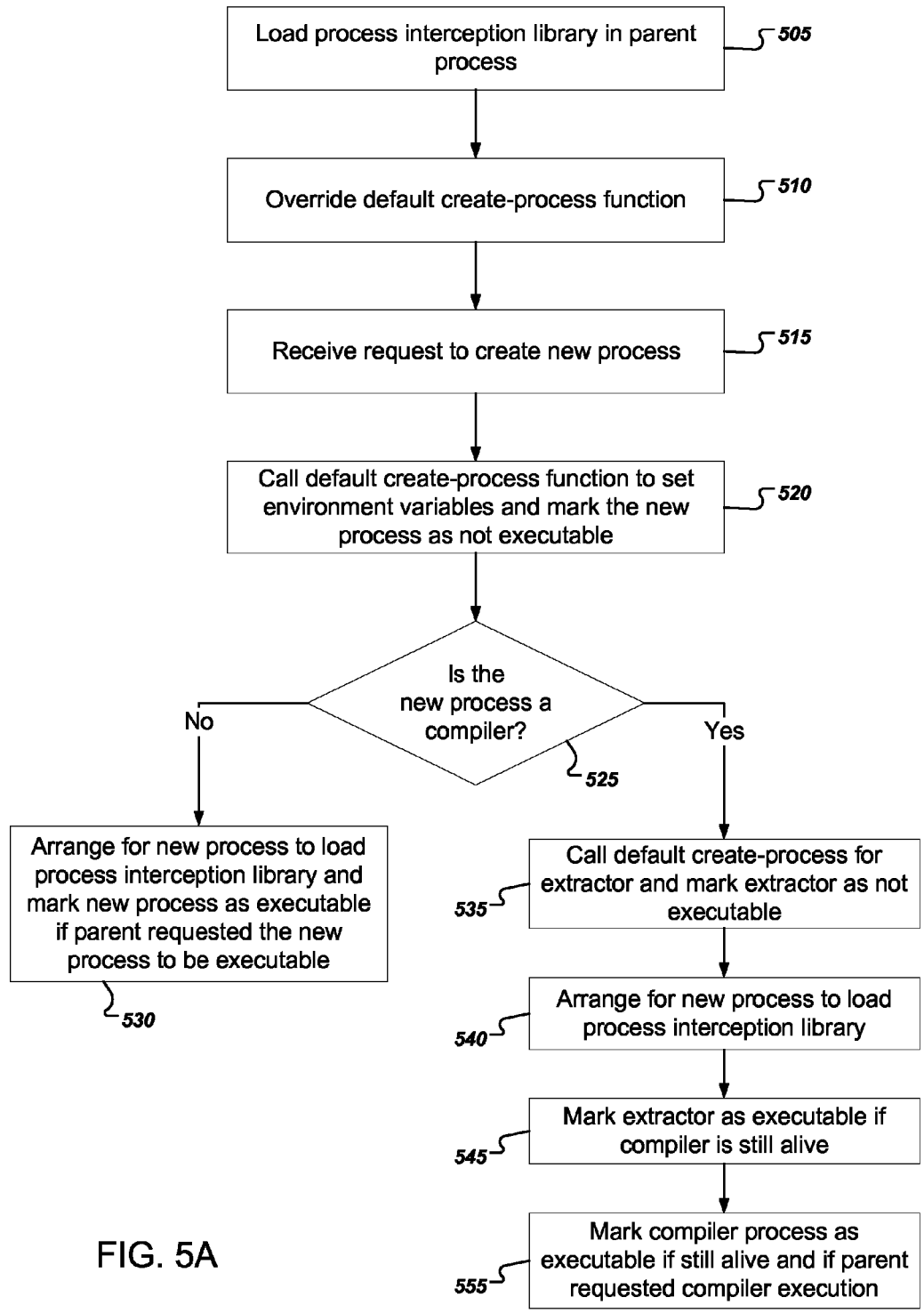
FIG. 5A is a flow chart of an example process performed by a custom create process function.

FIG. 5A is a flow chart of an example process performed by a custom create-process function. The process overrides default create-process functions, as is typically the case for Microsoft Windows-based systems. The process will be described as being performed by an appropriately programmed system of one or more computers.

The system loads the process interception library in a parent process (505). On Windows-based systems, the system can initiate an extraction process by calling a process that explicitly loads the process interception library. For example, the extraction utility 110 of FIG. 1 can explicitly load the process interception library.

FIGS. 6A-G illustrate example shared libraries loaded into process images. The parent process image 610 represents memory allocated to a parent process. The actual definition of the various functions within a particular operating system library and their allocation within a particular process image may be different than illustrated.

Figure 6A:
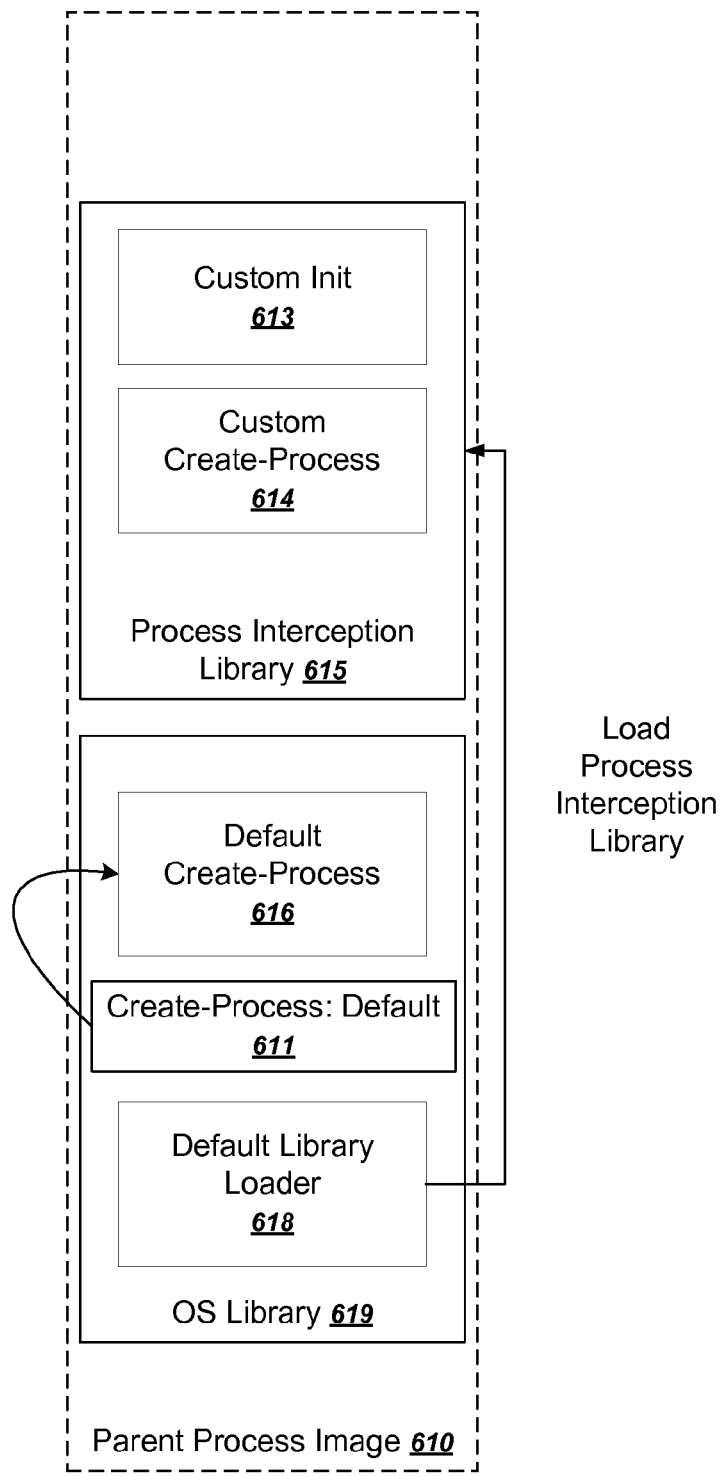
FIGS. 6A-6H illustrate example function modules loaded into process images.

In FIG. 6A, the parent process image 610 has loaded a default OS library 619 and the process interception library 615. However, the custom initialization function 613 within the process interception library 615 has not yet been executed. The OS library 619 includes a default create-process function 616 and a default library loader function 618. Although shown as a single library, the OS library 619 may actually represent multiple libraries. For example, on Windows-based systems, a new process loads ntdll.dll which includes the default library loader function LdrLoadDll. Loading ntdll.dll also causes the system to load kernel32.dll, which includes one of the default create-process functions, CreateProcess.

The process interception library 615 includes a custom initialization function 613 that runs when the process interception library 615 is loaded into a new process. The process interception library 615 also includes a custom create-process function 614.

The OS library 619 includes an export table 611 that specifies the addresses of all create-process functions within the OS library 619 that may be called by other functions in the parent process. In Microsoft Windows, for example, each shared library has its own an export table that specifies the addresses of functions available to other functions in the process. In FIG. 6A, the export table 611 includes an entry that points to the address of the default create-process function 616 in the process interception library 615.

Each shared library also has its own import table that specifies the functions it may call within other shared libraries. When the system loads the OS library 619, the operating system can prepopulate the import table by copying entries from the export tables of other shared libraries. Thus, if the system overrides the default create-process function in the export table early enough in process initialization, the operating system will automatically propagate the overridden address of the default create-process function to the import tables of other shared libraries.

As shown in FIG. 5A, the system overrides a default create-process function (510). On Microsoft Windows-based systems, the default create-process function is the CreateProcess defined in kernel32.dll or related process creation functions which may be defined in kernel32.dll or other system libraries, e.g., CreateProcessA, CreateProcessW, CreateProcessAsUserA, CreateProcessAsUserW, CreateProcessWithLogonW, and CreateProcessWithTokenW.

The system can override the default create-process function using custom initialization code that runs when the process interception library is loaded. For example, the custom initialization code can overwrite an entry in an export table for the default create-process function so that the export table actually points to the custom create-process function of the process interception library.

By overriding the default create-process function in custom initialization code when the process interception library is loaded, the system can ensure that the address in the export table is overwritten early enough in process initialization that the operating system will populate the overwritten address into the import tables of other shared libraries.

Figure 6B:
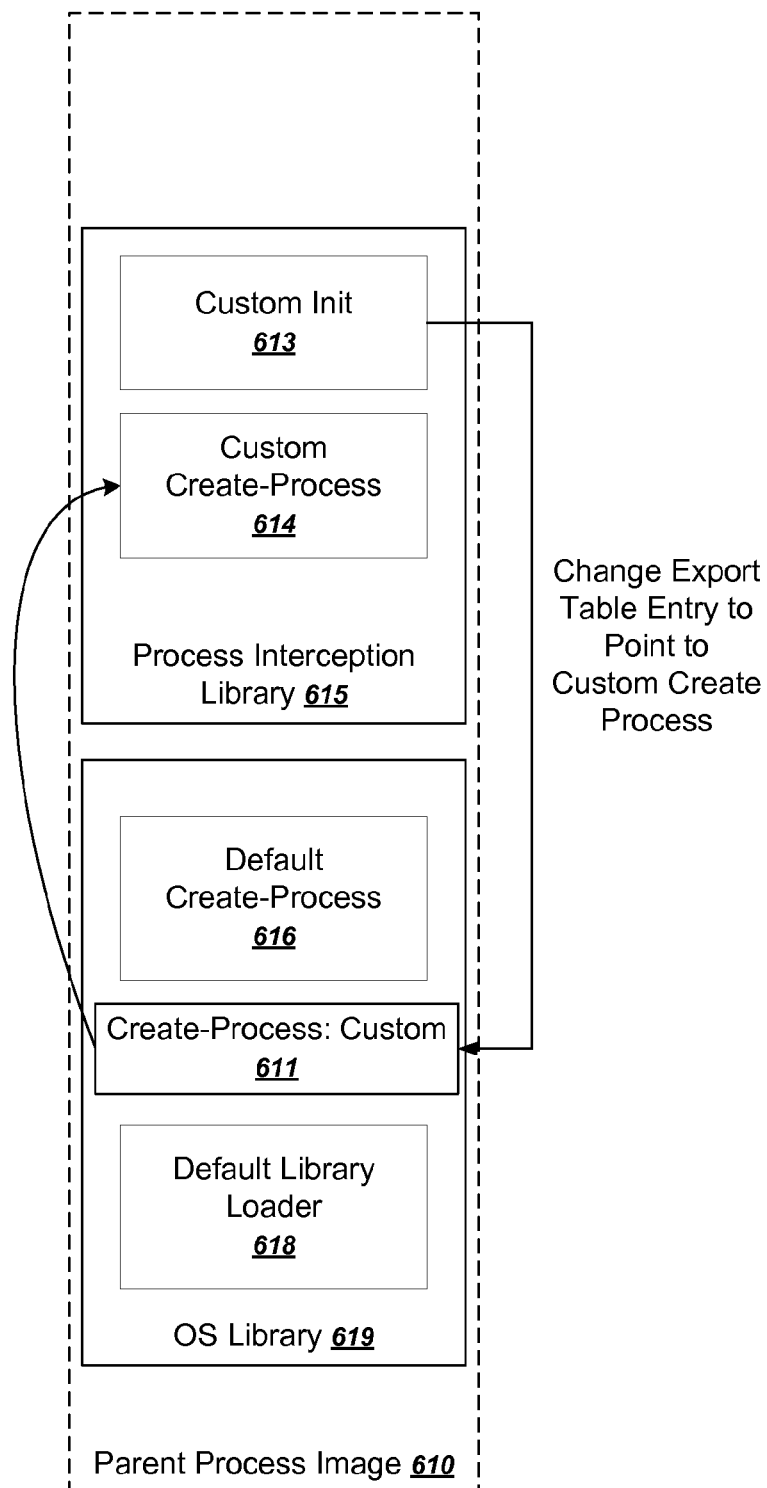

In FIG. 6B, the custom initialization function 613 overwrites the entry in the export table 611. Now the entry in the export table 611 for the create-process function points to the custom create-process function 614.

As shown in FIG. 5A, the system receives a request to create a new process (515). For example, the request may come from an extraction utility of the static analysis system invoking a new process in order to run a build utility of the build system. Because the export table has been overwritten, the call to the create-process function will actually call the custom create-process function.

The system calls the default create-process function to set environment variables and marks the new process as not executable (520). In process that have multiple threads, marking a process as executable can include marking a particular thread within the process as executable. The custom create-process function can create the new process by calling the default create-process function. The custom create-process function can initially request that the new process be marked as not executable so that the new process can be initialized properly. For example, the custom create-process function can ensure that the operating system does not attempt to execute the new process before the new process loads the process interception library.

The default create-process function allocates space in memory, loads the process image from disk into the allocated memory, loads the OS library into the new process, and sets the execution pointer to the main function of the process image.

Figure 6C:
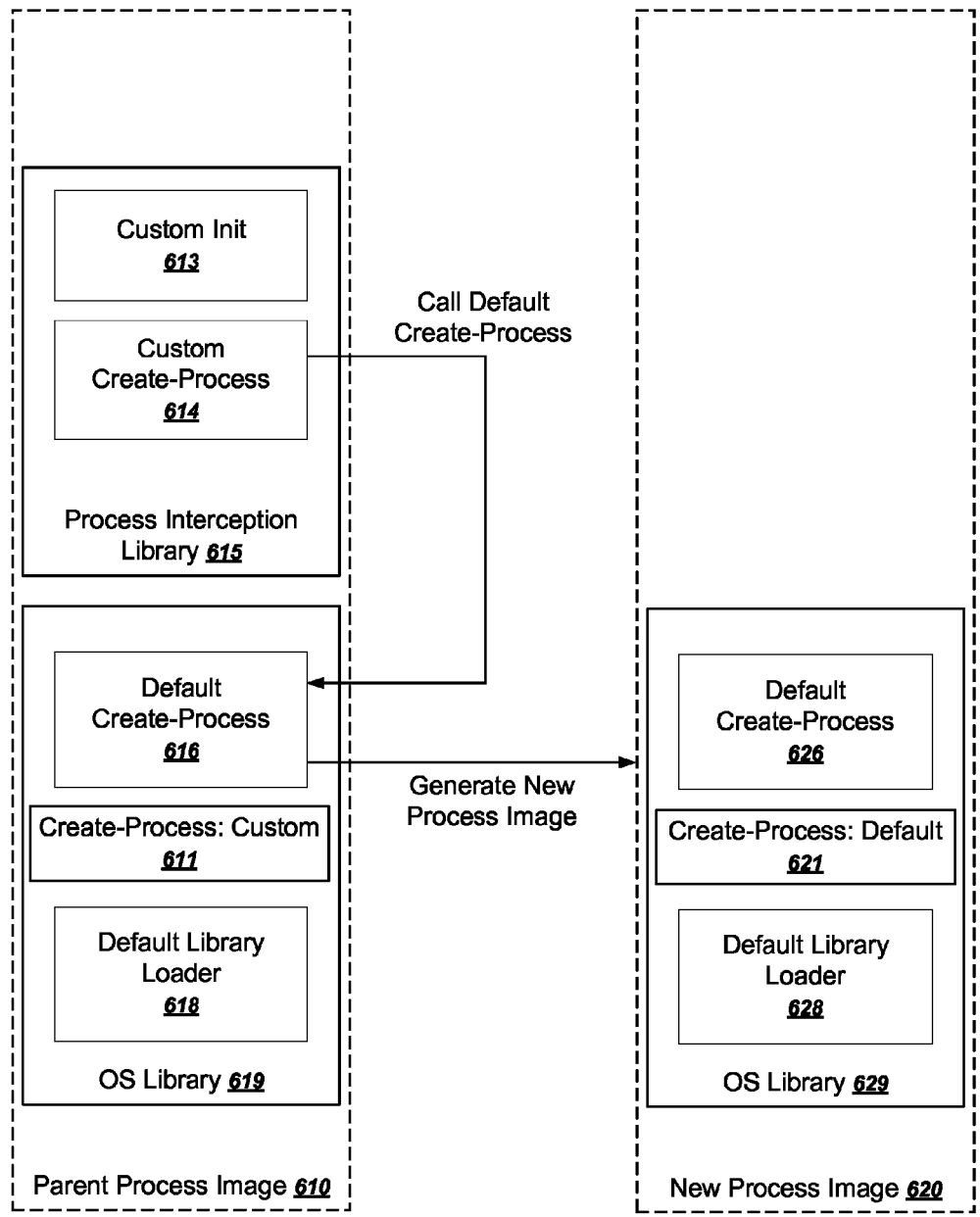

In FIG. 6C, the custom create-process function 614 calls the default create-process function 616. The default create-process function 616 then generates the new process image 620, loads the OS library 629 into the new process image 620, which now includes its own default create-process function 626 and its own default library loader function 628. For example, on Windows-based systems, the system loads ntdll.dll which includes the default library loader function LdrLoadDll. Loading ntdll.dll also enqueues a load of kernel32.dll, which includes the default create-process function CreateProcess.

As shown in FIG. 5A, the system determines whether the new process is a compiler (525). For example, the system can compare the location of the executable file of the new process to a list of known compilers or compare the name of the executable file to a regular expression, as described above with reference to FIG. 3A.

If the new process is not a compiler, the system arranges for the process interception library to be loaded in the new process and marks the process as executable if the parent process requested the new process to be executable (branch to 530). Arranging for the new process to load the process interception library will cause the new process to run library initialization code of the process interception library, which will override the default create-process function in the new process. This will be described in more detail below with reference to FIG. 5D.

If the new process is a compiler, the system calls the default create-process function to create a new process for the extractor and marks the extractor process as not executable (branch to 535). The system may optionally kill the newly created process, e.g., if the extractor is a copy of the newly created process but with different command-line arguments.

The system then arranges for the process interception library to be loaded in all new processes and marks the new processes as executable (540).

The system marks the extractor as executable if the compiler process is still alive (545). Marking the extractor as executable will cause the system to begin executing the extractor process. In some implementations, the system waits for the extractor to exit prior to marking the compiler process as executable.

The system can cause the compiler to run before the extractor by sending the newly created compiler and extractor processes requests to run respective remote procedure calls defined in the process interception library.

The system sends the extractor process a request to run a remote procedure call for a function that instructs the extractor to wait for the compiler to finish. The remote procedure call will generally specify the process ID and thread ID of the compiler. In some implementations, the function instructs the extractor to wait for a wake-up signal from the compiler process as specified by the process ID.

The system also sends the compiler process a request to run a remote procedure call for a function that wakes up the extractor when the compiler exits. Waking up the extractor process will be described in more detail below with reference to FIGS. 5B-C.

The system marks the compiler process as executable if the compiler process is still alive and if the parent process requested execution of the compiler process (555). The system will thus execute the compiler process once the threads are marked as executable.

Figure 5B:
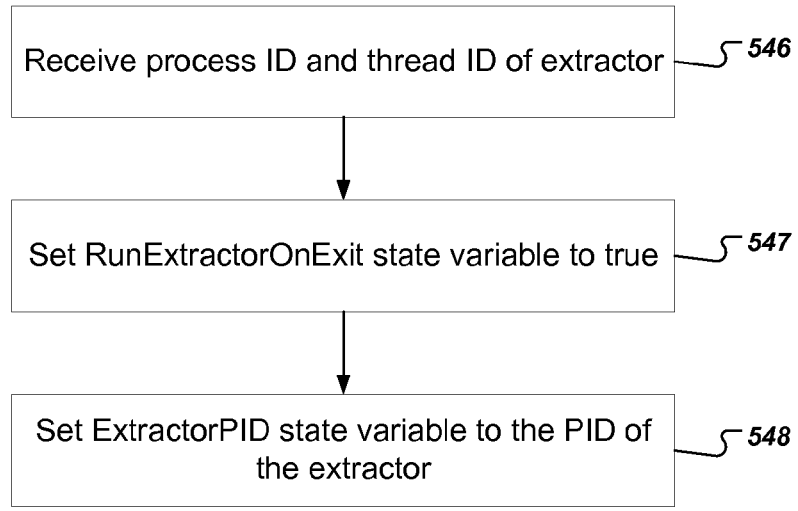
FIG. 5B is a flow chart of an example process performed by a compiler remote procedure call.

FIG. 5B is a flow chart of an example process performed by a compiler remote procedure call. In general, the compiler sets a flag that will be checked when the compiler exits. The process will be described as being performed by an appropriately programmed system of one or more computers.

The system receives a process ID and a thread ID of an extractor (546). The remote procedure call received from the parent process will specify the process ID and the thread ID of the newly created extractor process.

The system sets a RunExtractorOnExit state variable to true (547). The RunExtractorOnExit state variable is a variable of the compiler process that will be checked by custom deinitialization code of the process interception library. The custom deinitialization code is run when the compiler process exits.

The system sets the ExtractorPID state variable to the process ID of the extractor (548). By setting the RunExtractorOnExit state variable, the custom deinitialization code of the process interception library can send a wake-up signal to the extractor when exiting using the process ID of the extractor.

Figure 5C:
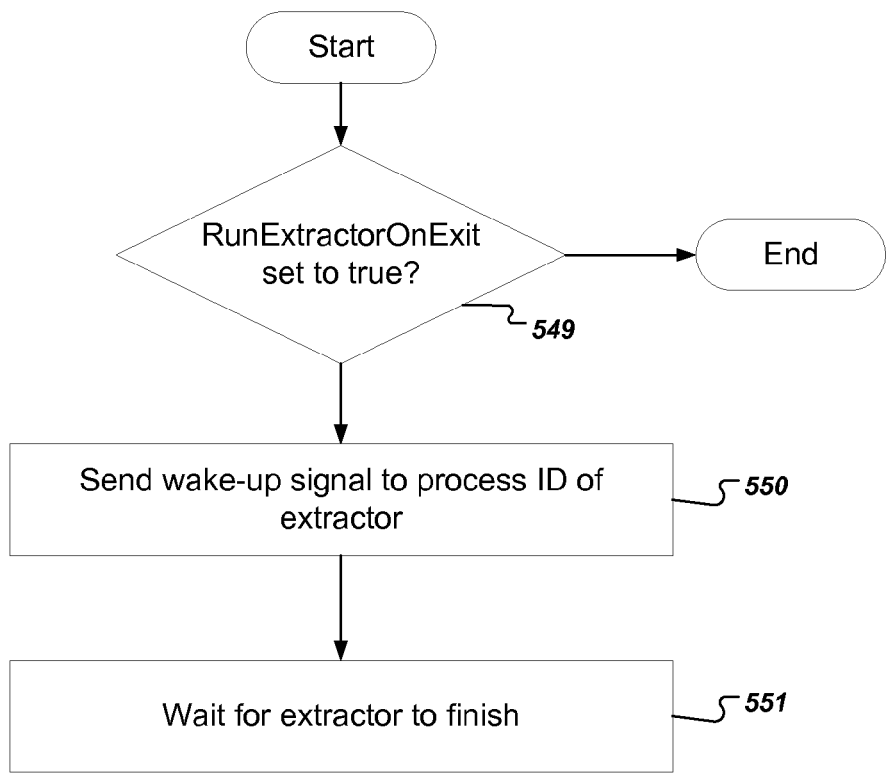
FIG. 5C is a flow chart of an example process performed by deinitialization code of a compiler process.

FIG. 5C is a flow chart of an example process performed by deinitialization code of a compiler process. In general, the deinitialization code checks a state variable to determine whether to send the extractor a wake-up signal. The process will be described as being performed by an appropriately programmed system of one or more computers.

The system determines whether the RunExtractorOnExit state variable is set to true (549). If the state variable is not set to true, the process ends.

If the state variable is set to true, the system sends a wake-up signal to the process ID of the extractor process (branch to 550). Upon receiving the wake-up signal, the extractor will extract source code of the source code files compiled by the compiler. The extractor will also generally have access to object code and other files generated by the compiler.

The system waits for the extractor process to finish (551). The compiler process can ensure that the extractor process is not inadvertently cleaned up by the build system by waiting for the extractor process to finish and can also ensure that the source code files have not been deleted by the build system.

Figure 5D:
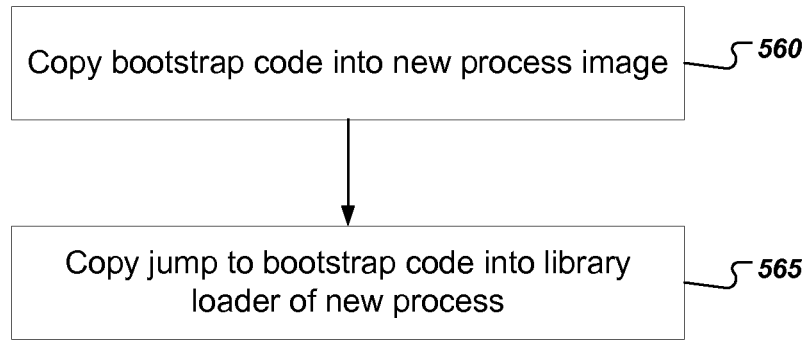
FIG. 5D is a flow chart of an example process for a parent process to arrange for a new process load the process interception library.

FIG. 5D is a flow chart of an example process for a parent process to arrange for a new process load the process interception library. The process in FIG. 5D can be performed on operating systems that lack shared library environment variables that cause a shared library to be loaded automatically in new processes, e.g., LD_PRELOAD in Linux. The process will be described as being performed by an appropriately programmed system of one or more computers.

For operating systems that do not support shared library environment variables that cause shared libraries to be loaded automatically in new processes, the system can override a library loader function that is responsible for loading shared libraries. For example, on Microsoft Windows, a function LdrLoadDll is called that is responsible for loading each shared library. The custom initialization code of the process interception library can override this function in order to force it to load the process interception library into a new process whenever a new process is created.

The system copies bootstrap code into the new process image (560). The system can allocate memory in the new process image and copy bootstrap code, which can be defined in the process interception library, into the new process. The bootstrap code includes functionality to restore an overridden library loader function and to call the restored library loader function to load the process interception library into the new process image.

The system copies a jump instruction to the bootstrap code into the library loader of the new process image (565). The system can modify the first instruction of the default library loader function to include a jump instruction or, for brevity, a "jump," to the bootstrap code.

Thus, when the library loader function is called by the new process, the new process will actually execute the jump instruction and begin executing the bootstrap code. The library loader function is typically called very early in the initialization of a new process, e.g., when loading kernel32.dll. The parent process can also mark the new process as executable.

Figure 6D:
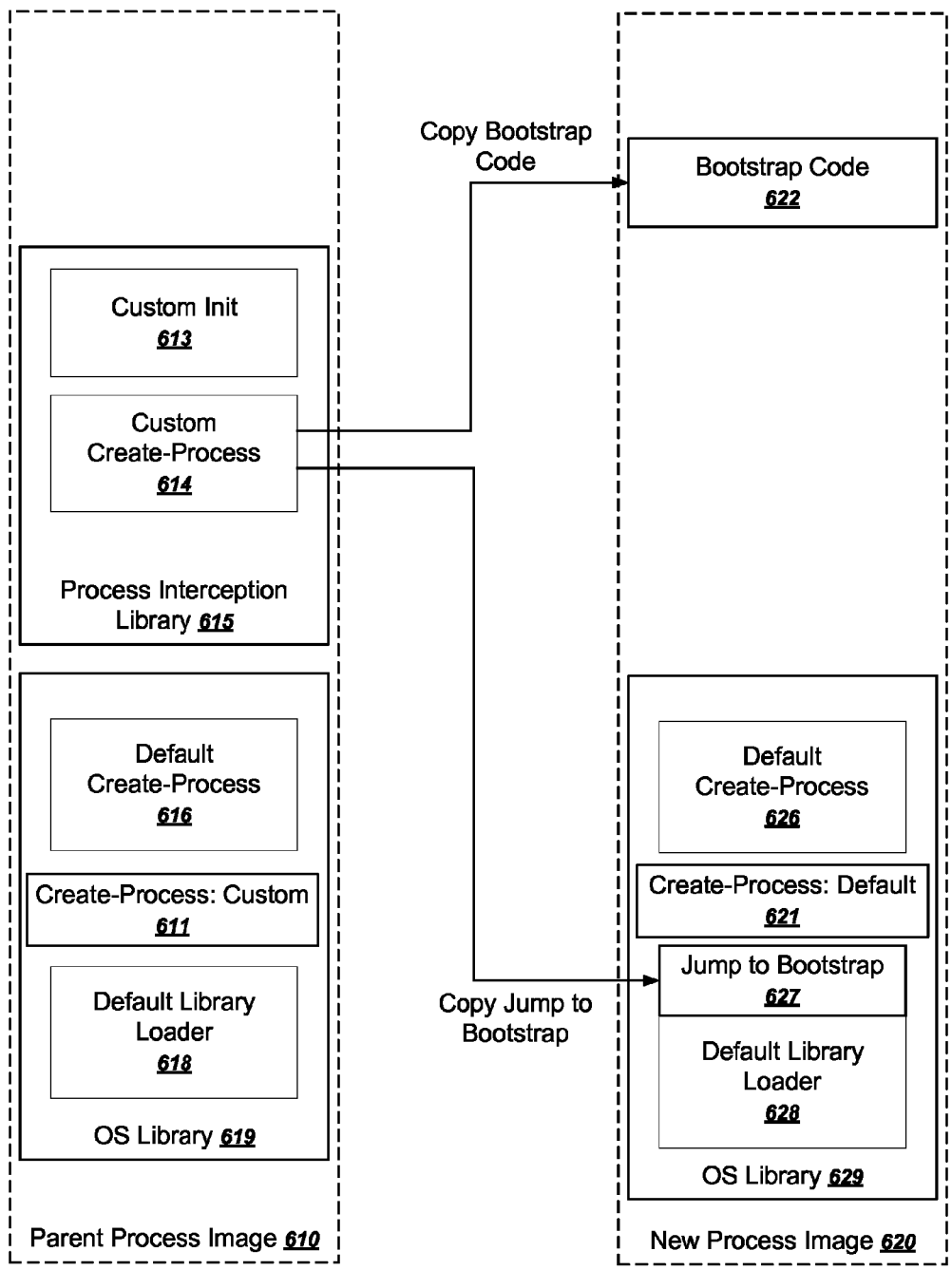

In FIG. 6D, the custom create-process function 614 allocates memory for and copies the bootstrap code 622 into the new process image 620. The custom create-process function 614 also writes a jump instruction to the bootstrap code 627 into the beginning of the default library loader function 628.

Figure 5E:
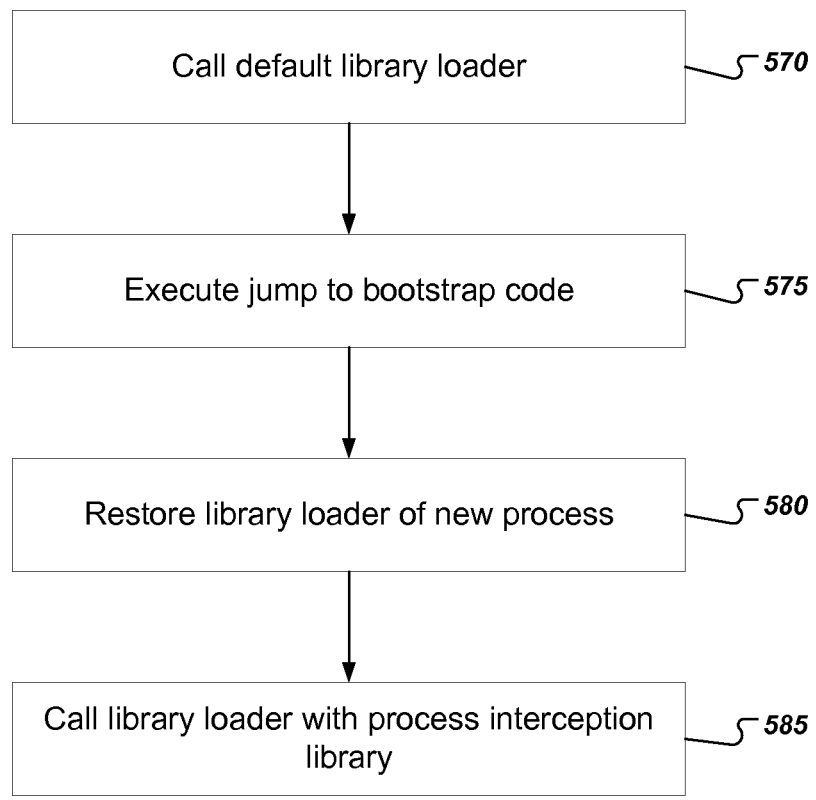
FIG. 5E is a flow chart of an example process for a new process to load a process interception library.

FIG. 5E is a flow chart of an example process for a new process to load a process interception library. A parent process has inserted bootstrap code into the new process and has altered a library loader function of the new process to include a jump instruction to the bootstrap code. The process will be described as being performed by an appropriately programmed system of one or more computers.

The system calls the default library loader (570). When the new process begins executing, the new process calls the default library loader in order to load libraries into the new process, e.g., an operating system library. However, the default library loader function now includes a jump into the bootstrap code.

The system executes a jump to the bootstrap code (575). Because the library loader function has been altered, the system actually executes the jump instruction to the bootstrap code inserted by the parent process.

Figure 6E:
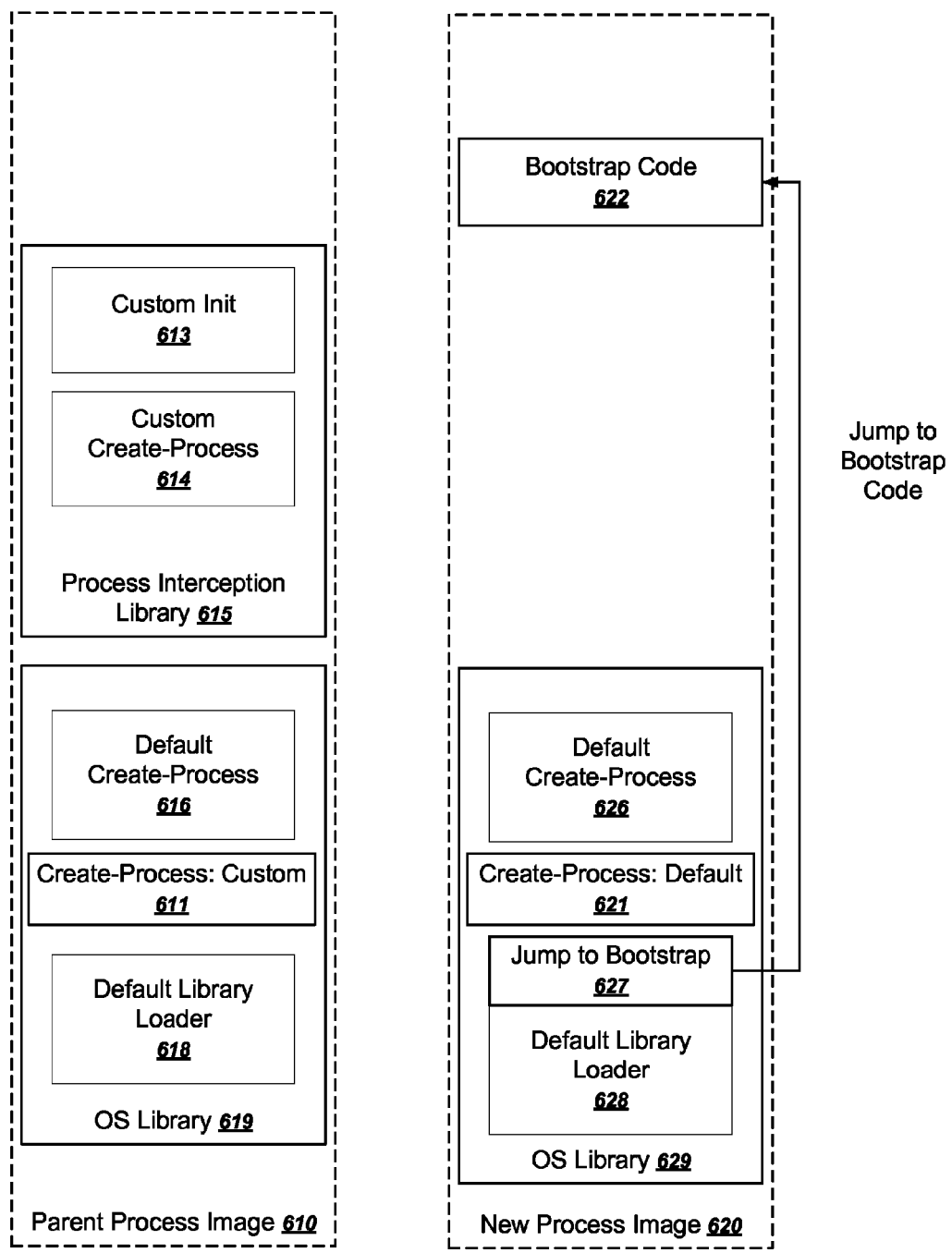

In FIG. 6E, when the new process begins to execute and requests that a library be loaded, the default library loader function 628 is called. The system will thus actually executes the jump to the bootstrap code 627.

As shown in FIG. 5E, the system restores the library loader of the new process image (580). After being called, the bootstrap code first restores the default library loader function by removing the jump to the bootstrap code and restoring the first bytes of code that had been there previously and had been overwritten by the jump to the bootstrap code.

The system then calls the default library loader function with the process interception library (585). The restored default library loader function will thus load the process interception library into the new process image. The system can then resume the original call to the library loader function.

Figure 6F:
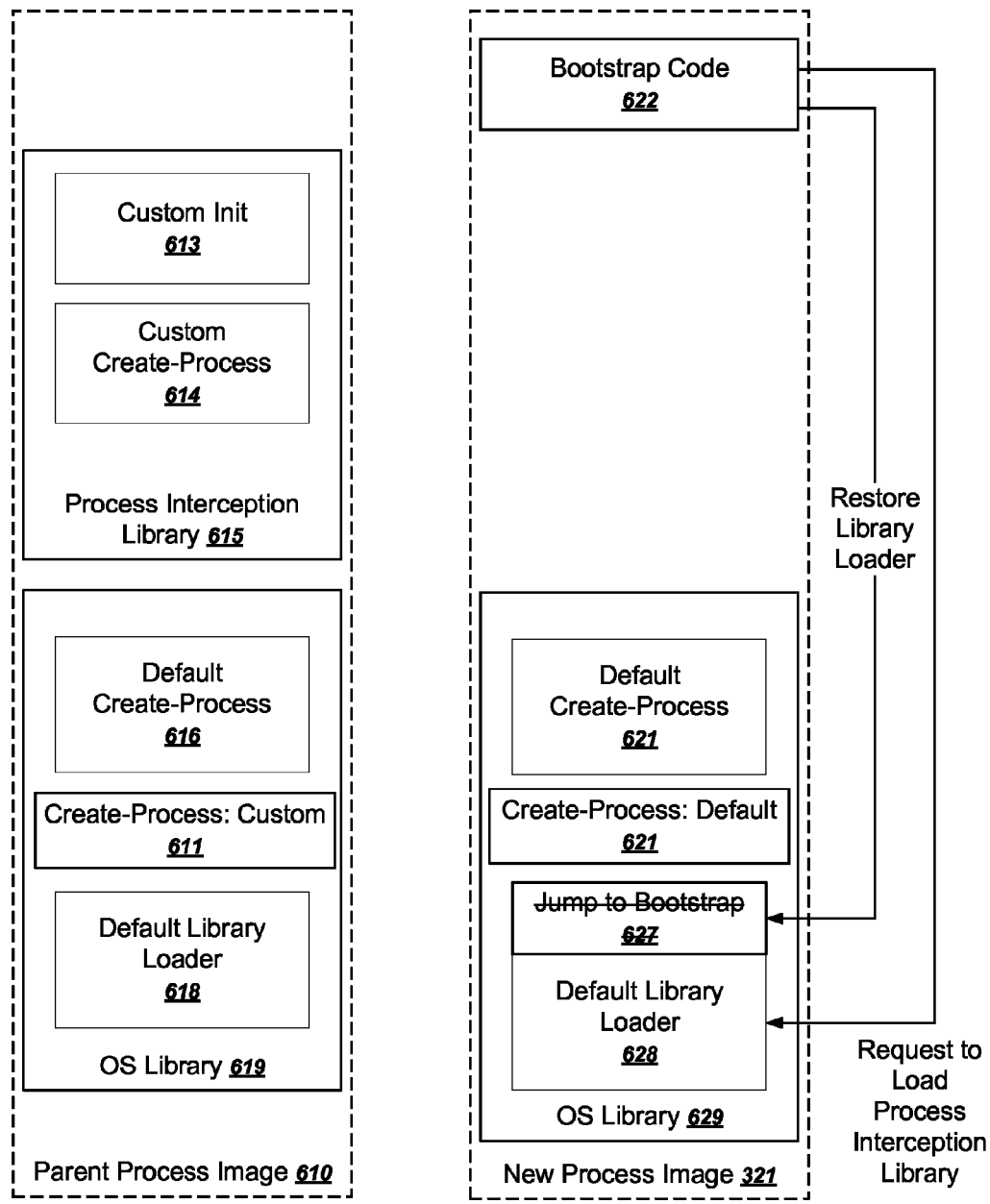

In FIG. 6F, the bootstrap code 622 restores the default library loader function 628, e.g., by deleting the jump to the bootstrap code 627. The bootstrap code 622 then calls the restored default library loader function 628 to load the process interception library.

Figure 6G:
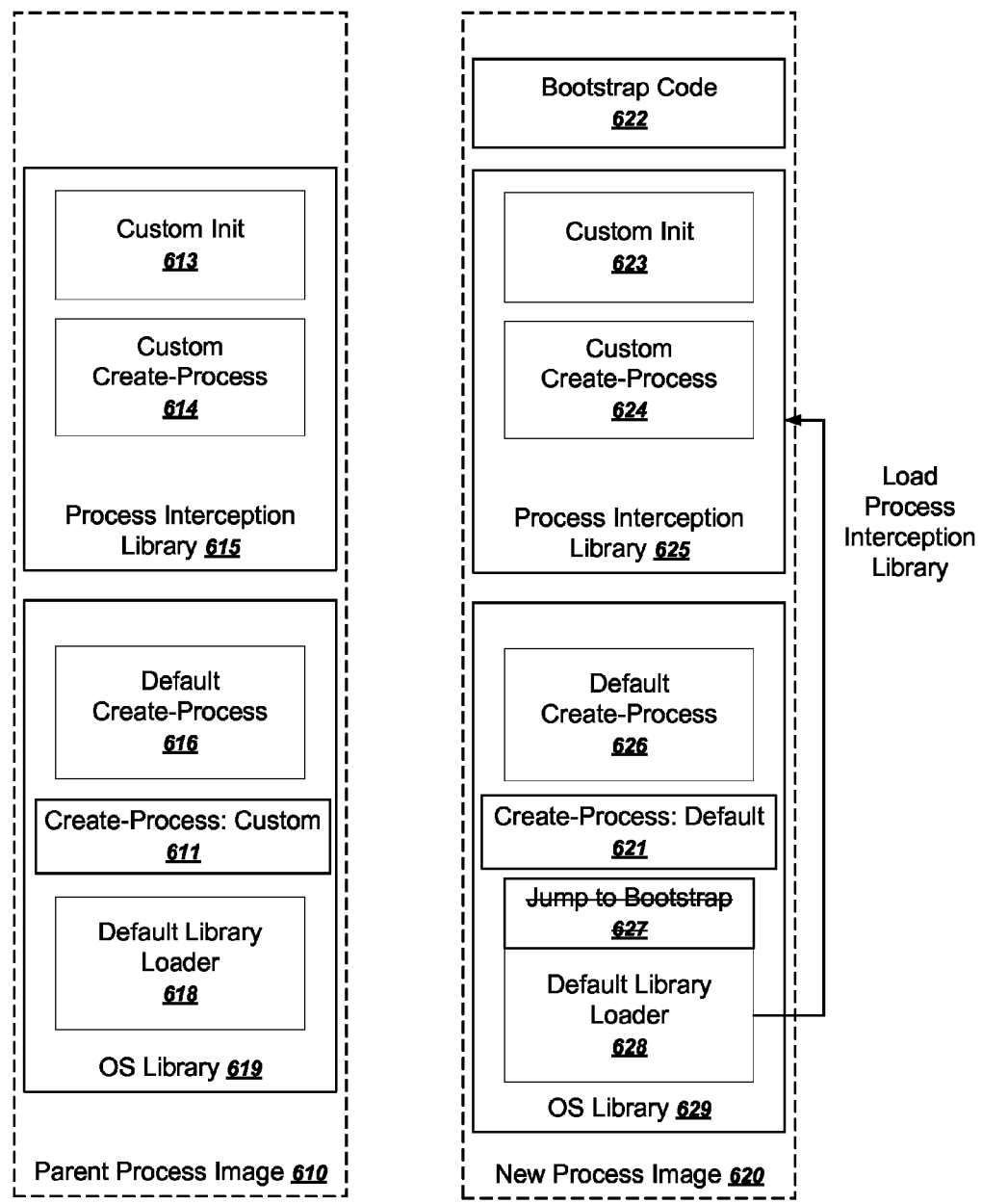

In FIG. 6G, the default library loader 628 loads the process interception library 625 into the new process image 620. Thus, the new process image 620 will now have its own copy of the custom initialization function 623 and the custom create-process function 624.

As mentioned above, loading the process interception library 625 causes the custom initialization function 623 to run, which will override the entry in the export table 621 thus preempting the default create-process function 626.

Figure 6H:
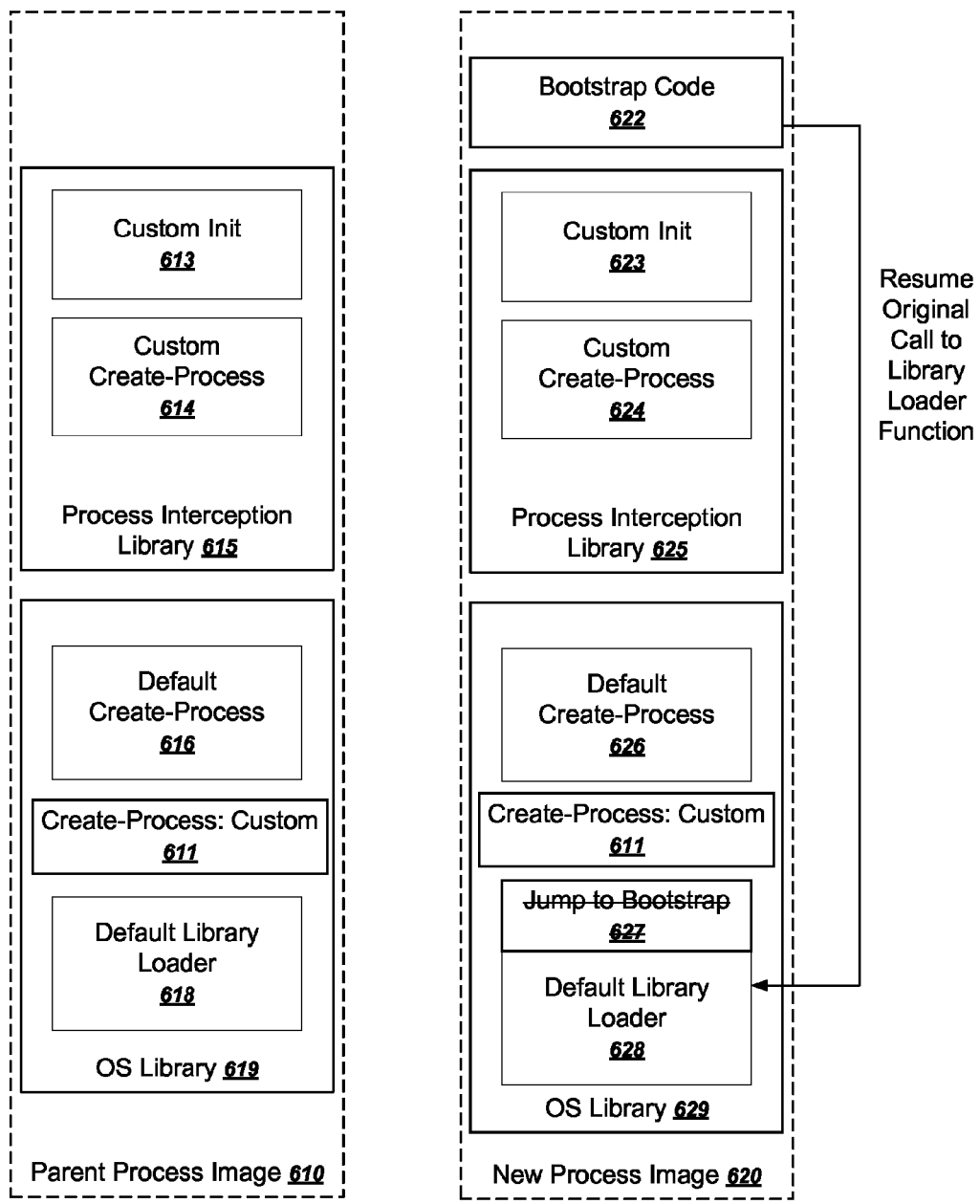

In FIG. 6H, after loading the process interception library, the bootstrap code can resume the original call to the default library loader function 628.

Figure 7:
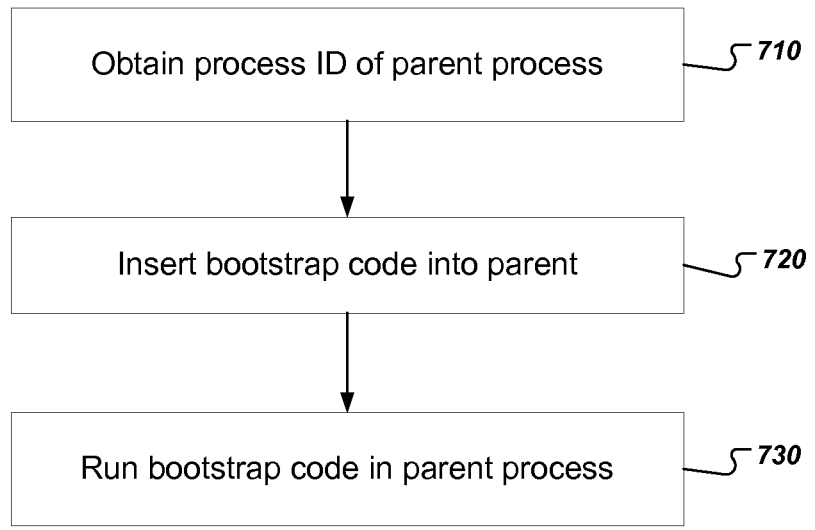
FIG. 7 is a flow chart of an example process for preempting process creation functions in preexisting process trees.

FIG. 7 is a flow chart of an example process for preempting process creation functions in preexisting process trees. In some situations, the build process may not be started by a static analysis system. For example, a continuous integration server can be configured to repeatedly spawn build utilities to compile source code of the project. The process in FIG. 7 can be performed by a tracer process of the static analysis system that handles preempting process creation functions. The system can configure the build utility of the build system to first invoke the tracer process before initiating any builds on the build system. For example, a user can add a command that invokes the tracer process at the beginning of a "makefile" that coordinates a build process on the build system. The process will be described as being performed by an appropriately programmed system of one or more computers.

The system obtains the process ID of a parent process (710). The system can for example make a call to NtQueryInformationProcess defined in ntdll.dll to request basic process information. A field conventionally named Reserved3 in the returned PROCESS_BASIC_INFORMATION structure represents the parent process ID.

The system inserts bootstrap code into the parent process image (720). As described above with reference to FIG. 5, the bootstrap code can make a request to load the process interception library into the parent process. In this case however, the bootstrap code is being inserted from a child process into a parent process.

The bootstrap code for preexisting process trees can also additionally handle overriding the default create-process functions in the parent process. For example, the system can queue a remote procedure call (RPC) in the parent process, which can be called by the bootstrap code when executed.

The system runs the bootstrap code in the parent process (730). For example, on Microsoft Windows, the system can execute the function CreateRemoteThread to create a thread in the parent process and instruct the thread to run the bootstrap code in the parent process.

As described above with reference to FIG. 5E, the bootstrap code in the parent process loads the process interception library using the library loader function. If the head of the library loader function was altered, the bootstrap code can restore it. And as described above, loading the process interception library will also cause the parent process to execute library initialization code associated with the process interception library.

However, the system may not be able to effectively preempt the default create-process function in the library initialization code. For example, because the parent process has already been executing, the parent process may have already cached the addresses in the export and import tables.

The system can instead use the bootstrap code to preempt the default create-process function. For example, if the child process requested an RPC, the bootstrap code can execute the requested RPC, which will handle preempting the process creation functions.

Preempting the default process creation function in an existing parent process will be described in more detail with reference to FIGS. 8-10.

Figure 8:
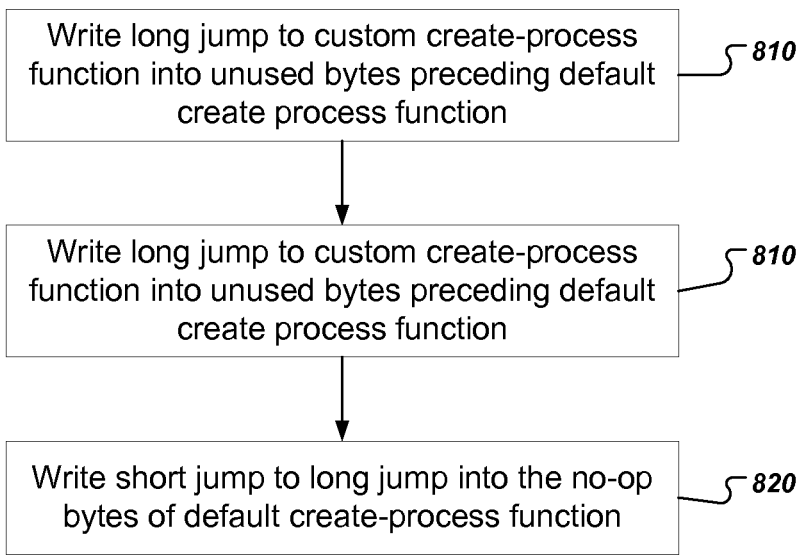
FIG. 8 is a flow chart of an example process for overriding a default create-process function in a preexisting 32-bit parent process.

FIG. 8 is a flow chart of an example process for overriding a default create-process function in a preexisting 32-bit parent process. In general, the system can modify the default create-process function to include an unconditional jump instruction to a custom create-process function of the process interception library. In some 32-bit operating systems, e.g., Microsoft Windows, some functions are "hot-patchable," meaning that they are designed to be replaceable at runtime. For hot-patchable functions, the five bytes that immediately precede the start of a function are unused, and the two bytes at the start of the function are a no-op instruction. The process will be described as being performed by an appropriately programmed system of one or more computers.

The system writes a long jump to the custom create-process function into the unused bytes of the default create-process function (810). The five unused bytes are enough to include a jump anywhere in the 32-bit address space.

The system writes a short jump to the long jump into the no-op bytes of the default create-process function (820). Now, when the default create-process function is called, the system takes a short jump to the long jump and then a long jump to the custom create-process function.

If the custom create-process function needs to create a new process using the default create-process function, the custom create-process function can do so by jumping to the start of the default create-process function, which is the address immediately after the 2-byte no-op instruction.

Figure 9A:
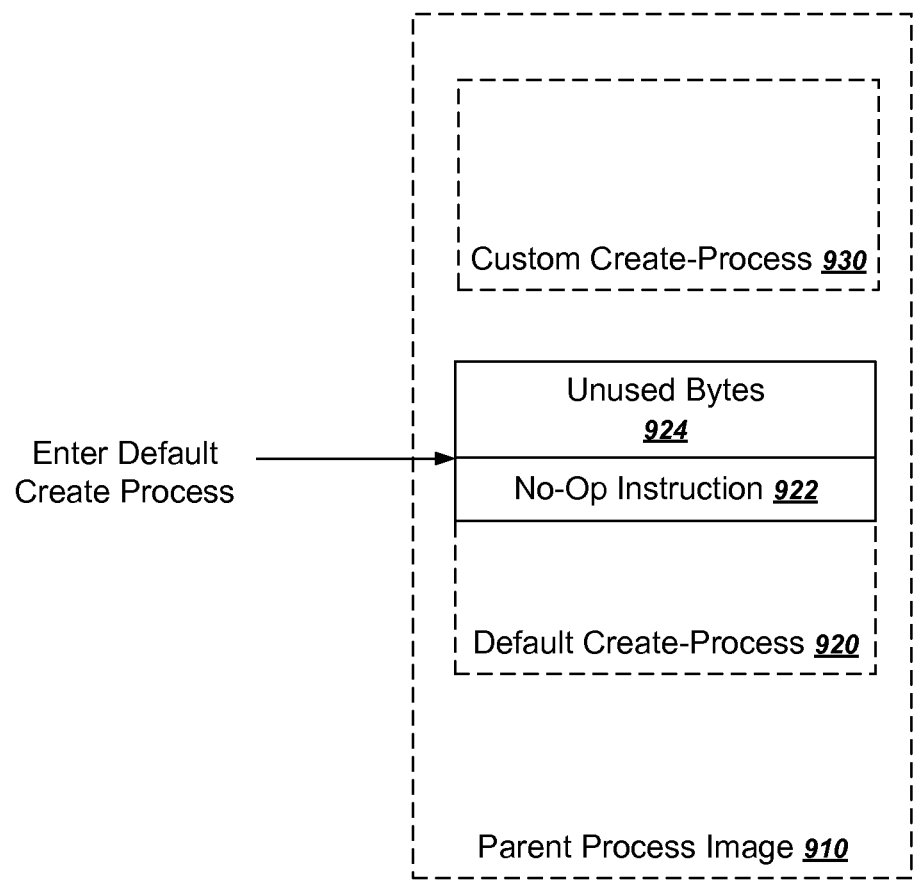
FIGS. 9A-B illustrate overriding the default process creation function in a 32-bit address space.
Figure 9B:
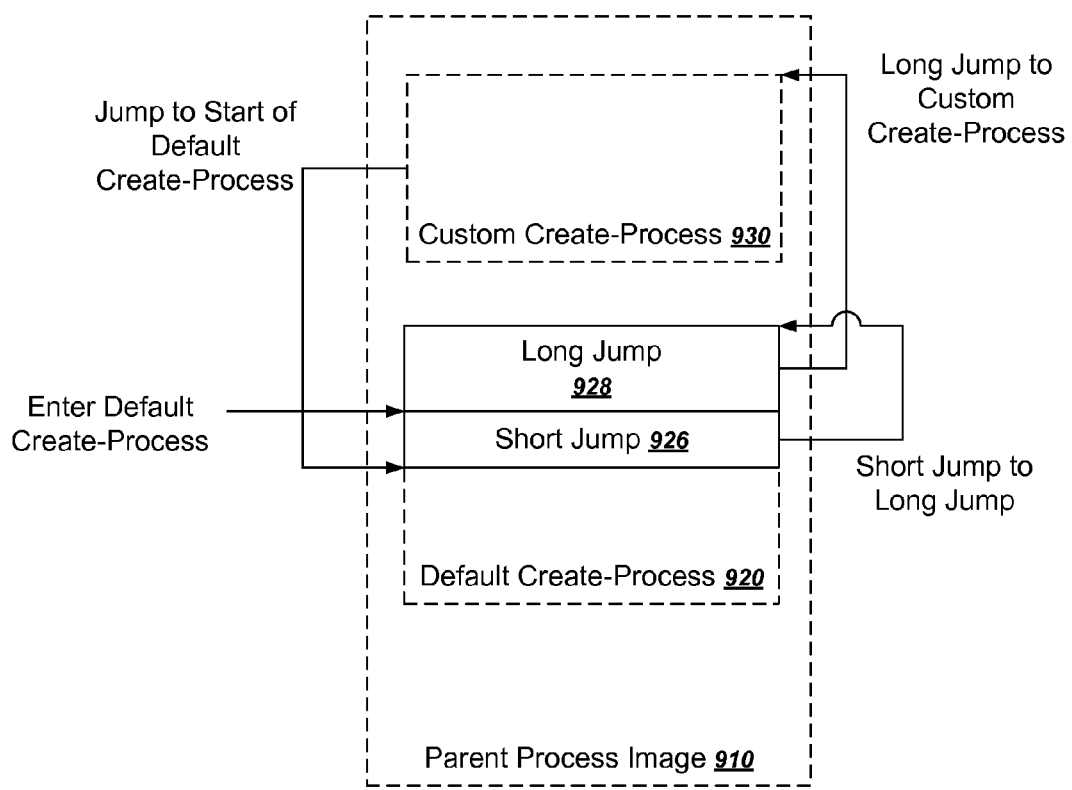

FIGS. 9A-B illustrate overriding the default process creation function in a 32-bit address space. In FIG. 9A, the default create-process function 920 can be called by a jump to the no-op instruction 922. The unused bytes 924 include the five bytes immediately preceding the no-op instruction at the beginning of the default create-process function 920.

The system can override the default create-process function by overwriting the unused bytes 924 and the no-op instruction 922. Afterwards, a jump to the default create-process function 920 results in a jump to the custom create-process function 930.

In FIG. 9B, the default create-process function 920 now starts with a short jump 926. The short jump 926 includes a jump to the long jump 928 in the unused bytes immediately preceding the default create-process function 920.

The long jump 928 includes a jump to the start of the custom create-process function 930. If the custom create-process function 930 needs to call the default create-process function 920, the custom create-process function 930 can use a jump to the actual start of the default create-process function 920. In other words, the jump is to the address immediately after the short jump 926.

Thus, when the system calls the default create-process function 920, the system takes the short jump 926 to the long jump 928. The system then takes the long jump 928 to the custom create-process function 930.

Now that the default create-process function has been overridden in the parent process, every process that the parent process spawns will also load a custom create-process function, as described above with reference to FIG. 5D-5E and FIGS. 6A-6H.

Figure 10:
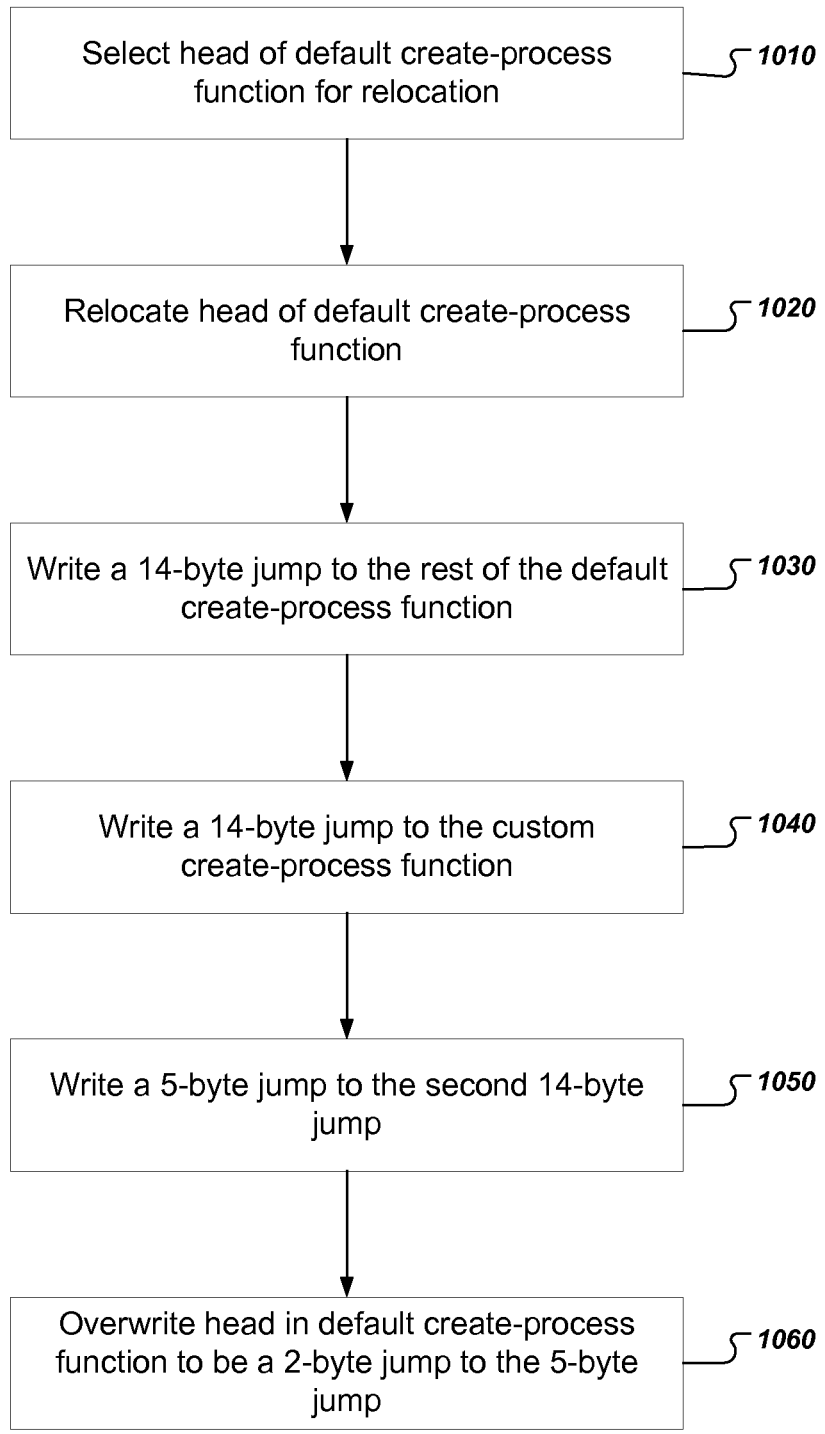
FIG. 10 is a flow chart of an example process for overriding a default create-process function in a preexisting 64-bit parent process.

FIG. 10 is a flow chart of an example process for overriding a default create-process function in a preexisting 64-bit parent process. In some 64-bit operating systems, e.g., Microsoft Windows, bytes immediately preceding the function are not guaranteed to be unused, and the two bytes at the start of the function are not no-op instructions. Thus, the system can relocate the head of the default process creation function to make room for the first of a series of unconditional jump instructions, including a new intermediate jump instruction, to the custom process creation function. The process will be described as being performed by an appropriately programmed system of one or more computers.

The system selects a head of the default create-process function for relocation (1010). In general, the system selects a particular whole number of instructions in the prefix of the function's prologue. In some implementations, the system also selects a head that is at least two bytes long.

The function prologue is a segment of code at the start of a function that initializes a function's stack frame. In some 64-bit operating systems, e.g., Microsoft Windows, every dynamically linked library has an exception-unwind table that includes information about the prologue of each function defined in the library. The exception-unwind table has information including how large the function prologue is and where the instruction boundaries in the prologue are.

The system relocates the head of the default create-process function (1020). The system can allocate memory elsewhere in the process and copy the head of the default process creation function to the new location.

The system writes a 14-byte jump to the rest of the default process creation function (1030). The system writes the 14-byte jump at an address immediately after the relocated head of the default process creation function. In this example, the system uses 14 bytes for a full long jump. However, the system can select any appropriate jump instruction can cover the entire address space of the parent process. For a 64-bit operating system, the system can use 14 bytes because some 64-bit architectures, e.g., AMD64, do not provide a primitive jump for 64-bit displacements. The jump can take execution of the process to the start of the portion of the default process creation function that was not in the relocated head.

The system writes a 14-byte jump to the custom create-process function (1040). The 14-byte jump to the custom create-process function can generally be located at any appropriate address of the process, e.g., address that are within $2^{31}$ bytes from the 5-byte jump below.

The system writes a 5-byte jump to the 14-byte jump to custom create-process function (1050). The system chooses an intermediate size jump to increase the probability that the system can find enough space that is within range of a jump that fits within the space of the relocated head. Thus, if the relocated head included two bytes, the system can choose the intermediate jump to be a 5-byte jump. The system places the intermediate jump at an address location that is within range of a 2-byte jump. The system overwrites the head in the default create-process function to be a 2-byte jump to the 5-byte jump (1060). By rewriting the head of the create-process function to be a jump, the system overrides the default create-process function. Now, when the default create-process function is called, a series of jumps is initiated that ends at the custom create-process function. When the custom create-process function needs to create a new process by calling the default create-process function, the system can jump to the relocated head, which then causes a 14-byte jump back to the rest of the default create-process function.

In some cases, the system can omit the intermediate jump if the location of the 14-byte jump to the custom create-process function is within range of the 2-byte jump. Thus, the system can instead write the 2-byte jump to be a jump right to the 14-byte jump to the custom create-process function.

Figure 11A:
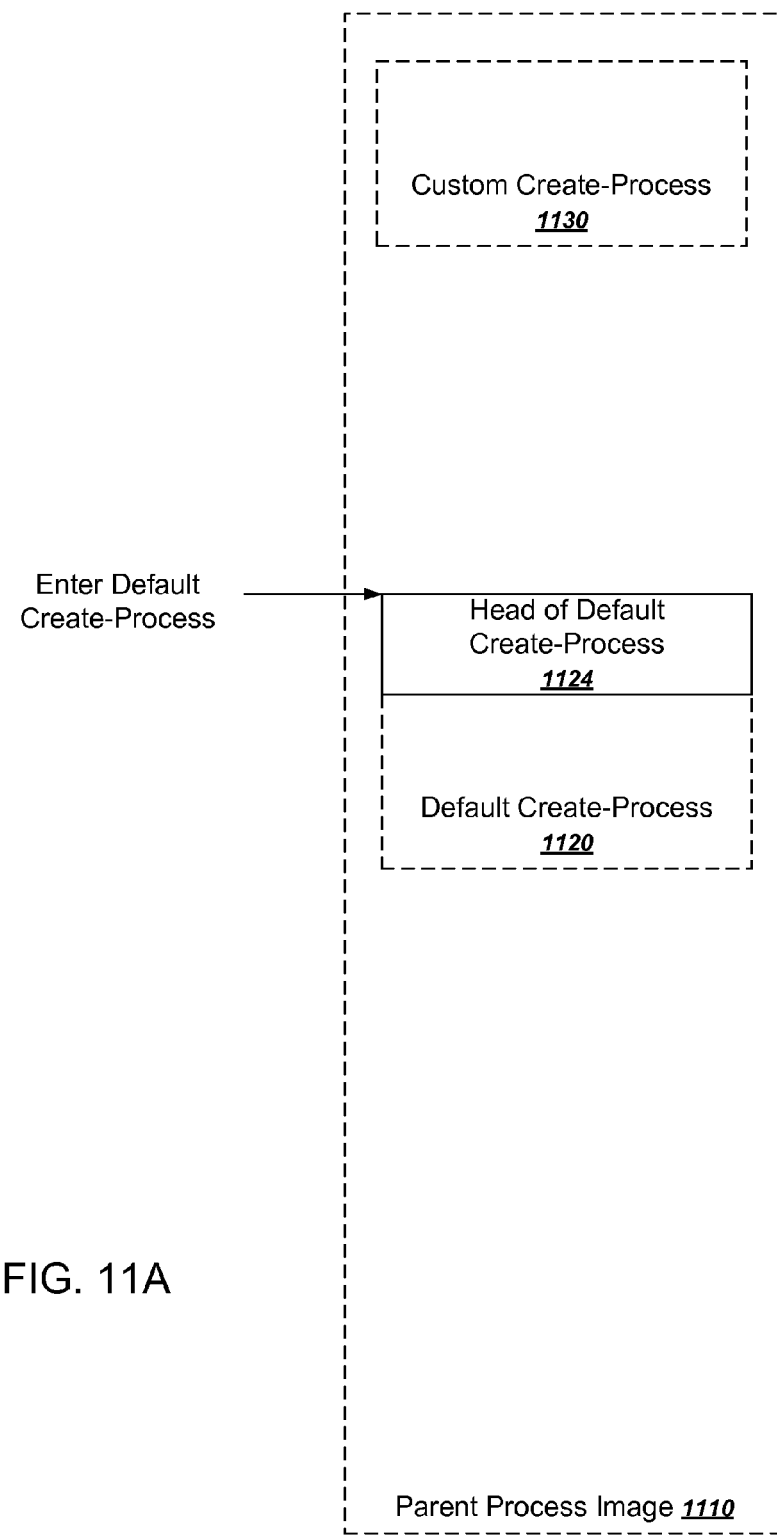
FIGS. 11A-11B illustrate overriding the default process creation function in a 64-bit address space.
Figure 11B:
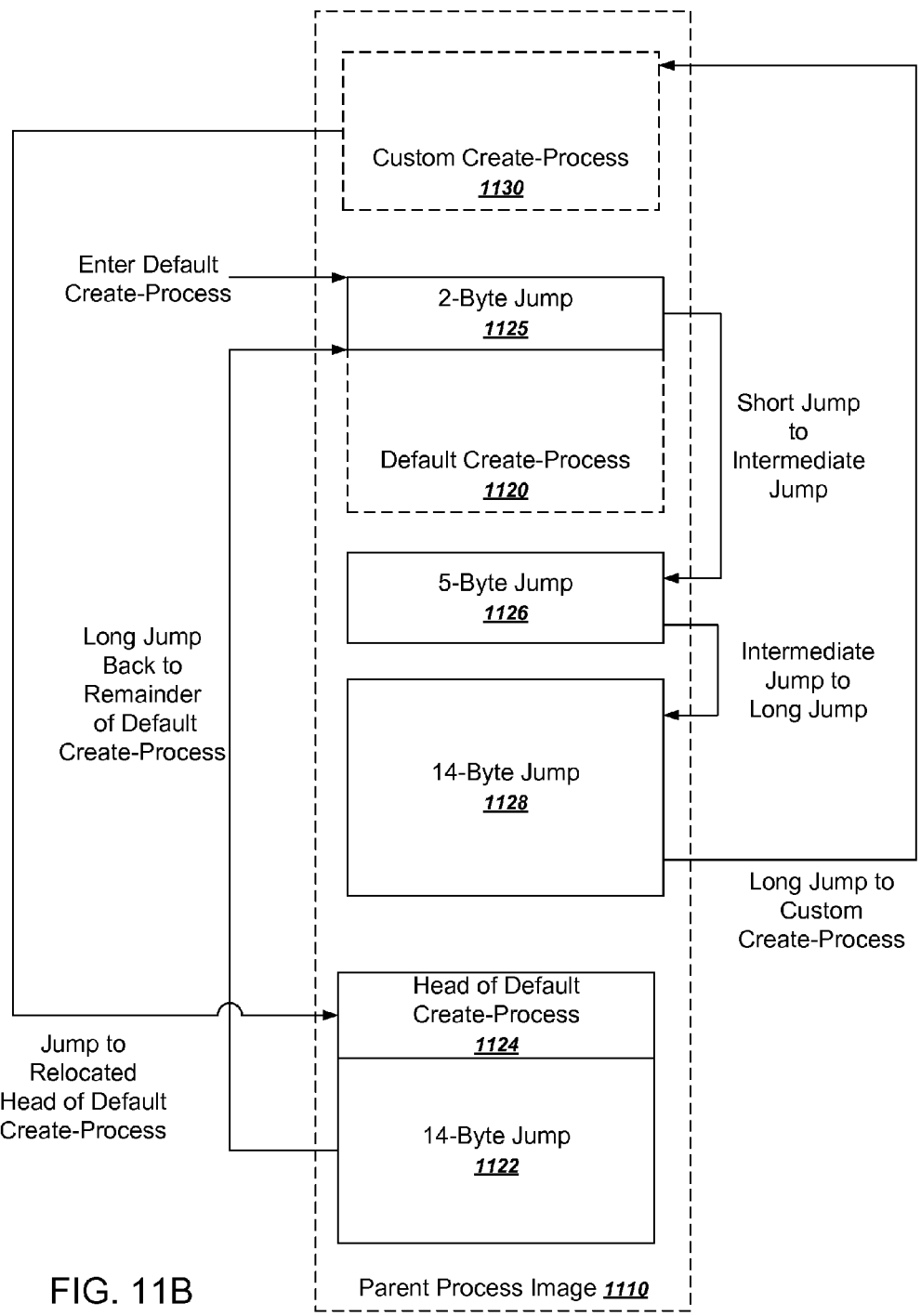

FIGS. 11A-11B illustrates overriding the default process creation function in a 64-bit address space. In FIG. 11A, the default create-process function 1120 has a head 1124 at the beginning. The system can relocate the head 1124 and include in the parent process image 1110 a series of jumps to the custom create-process function 1130.

In FIG. 11B, the system has relocated the head 1124 of the default create-process function 1120, and the system has written a first 14-byte jump 1122 back to the rest of the default create-process function 1120.

The system has added a 2-byte jump 1125 in place of the head 1124 at the start of the default create-process function 1120. The system has also added a 5-byte jump 1126 to a second 14-byte jump 1128 to the custom create-process function 1130.

Thus, when the system calls the default create-process function 1120, the system takes the 2-byte jump 1125 to the 5-byte jump 1126. The system then takes the 5-byte jump 1126 to the 14-byte jump 1128. The system then takes the 14-byte jump to the custom create-process function 1130.

To call the default create-process function 1120, the custom create-process function 1130 can jump to the relocated head of the default create-process function 1124. The system then takes a 14-byte jump 1122 back to the remainder of the default create-process function 1120.

Many build utilities of build systems can perform incremental builds of snapshots of a source code base. An incremental build is a build that compiles only source code files in a particular snapshot that have changed since a previous snapshot was built. A static analysis system that launches a source code extractor only when a compiler is launched may thus be able to generate analysis artifacts only for the source code files that have changed since the previous snapshot was built. These partial analysis artifacts may be referred to as incremental analysis artifacts, as distinguished from a full set of analysis artifacts generated from a full build of source code files of a previous snapshot of the project.

A static analysis system can generate a full set of analysis artifacts using an incremental set of analysis artifacts generated from an incremental build. A static analysis system can effectively generate a new full set of analysis artifacts from one previous full build and from incremental analysis artifacts generated from any arbitrarily long sequence of incremental builds.

Figure 12:
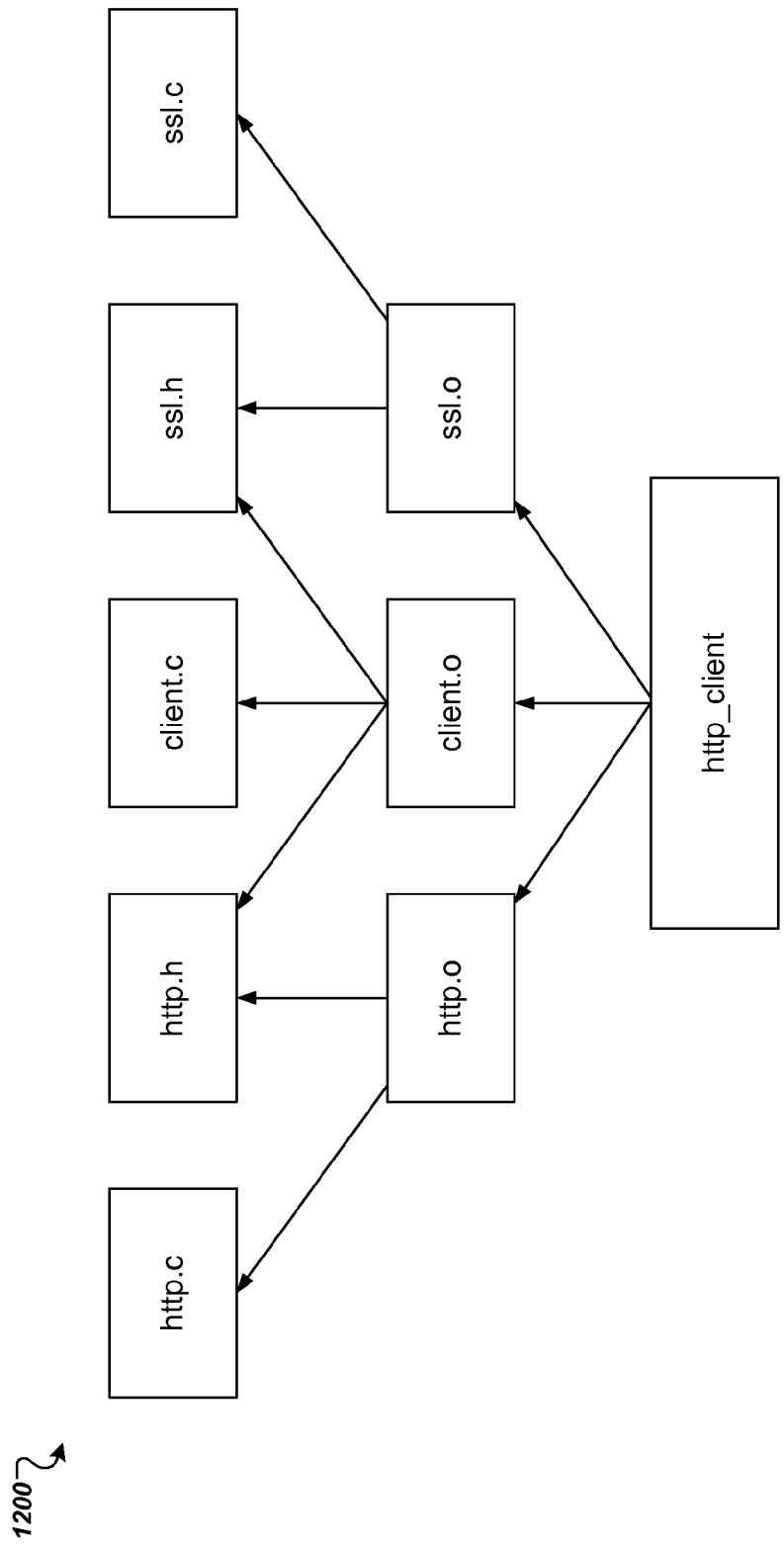
FIG. 12 illustrates a dependency graph for an example project.

FIG. 12 illustrates a dependency graph 1200 for an example project. The dependency graph 1200 is a representation of the dependencies that can be defined by a build utility. For example, the dependency graph 1200 can represent dependencies in a makefile.

Each node represents a file involved in building a project, and each edge between nodes represents a dependency of one file on another file during the build process. For example, the http.o file depends on source code in http.c and http.h. The http_client executable file depends on all three object files http.o, client.o, and ssl.o.

A build utility of a build system can build the example project using the "cc" source code compiler and the "ld" linker by issuing the following sequence of commands:

$ cc -o http.o http.c
$ cc -o ssl.o ssl.c
$ cc -o client.o client.c
$ ld client.o http.o ssl.o -o http_client On each compiler run, a static analysis system can launch a source code extractor that generates analysis artifacts, as described in more detail above. An analysis artifact is a collection of data generated by a source code extractor or another static analysis tool, as opposed to an object file or an executable generated by the build utility or a compiler. The examples below will refer to analysis artifacts being stored as files of a file system. However, analysis artifacts can also be stored in any appropriate data repository, e.g., as records in a database. Furthermore, the allocation of analysis information to the various files described below may be different than described.

Some analysis artifacts are information artifacts. Information artifacts include any information that a static analysis system generates for use in analyzing source code files, which typically includes various properties of the source code in the source code files, e.g., information that describes relationships between source code constructs in the snapshot, e.g., between variables, functions, and classes. An information artifact can also include information identifying various characteristic segments of source code having a particular attribute. For example, a static analysis system can identify source code segments that include violations of a particular coding standard, e.g., a segment of source code that compares variables of different types.

In some implementations, a source code extractor generates an information artifact for each source code file. However, there need not be a one-to-one relationship between source code files and information artifacts. For some source code languages, the static analysis system may generate an information artifacts for each variable type used during compilation.

Some analysis artifacts are set artifacts. Set artifacts include data representing files that were involved in extraction of source code by a source code extractor. Thus, set artifacts identify source code files that were processed by the extractor, headers that were imported to compile the source code files, and information artifacts that the system generated.

Analysis artifacts also include dependency artifacts. Dependency artifacts include data representing dependencies that exist only between information artifacts. For example, an information artifact may depend on another information artifact if the system generates a separate information artifact for each variable type defined by the source code. The dependency artifacts then save space by preventing each set artifact from replicating all information about all types used in the system.

A static analysis system can use the set artifacts and dependency artifacts in order to correctly generate a full set of analysis artifacts from incremental analysis artifacts generated during an incremental build. For example, because the extractor was launched three times during the full build of the project illustrated in FIG. 12, the system can generate three set artifacts, stored as the set files having a ".set" extension shown in Table 1. The set files identify source code files, include files, and information artifacts stored as information files having a ".info" extension.

TABLE 1

| FILENAME | FILES INVOLVED IN EXTRACTION |
| --- | --- |
| http.c.set | Source |
| | http.c |
| | Include |
| | http.h |
| | Info |
| | http.c.info, |
| | http.h.info |
| ssl.c.set | Source |
| | ssl.c |
| | Include |
| | ssl.h |
| | Info |
| | ssl.c.info, |
| | ssl.h.info |
| client.c.set | Source |
| | client.c |
| | Include |
| | http.h |
| | ssl.h |
| | Info |
| | client.c.info, |
| | http.h.info |
| | ssl.h.info |

The data included in set artifacts for a build can be used to generate a build graph representation of the build.

Figure 13A:
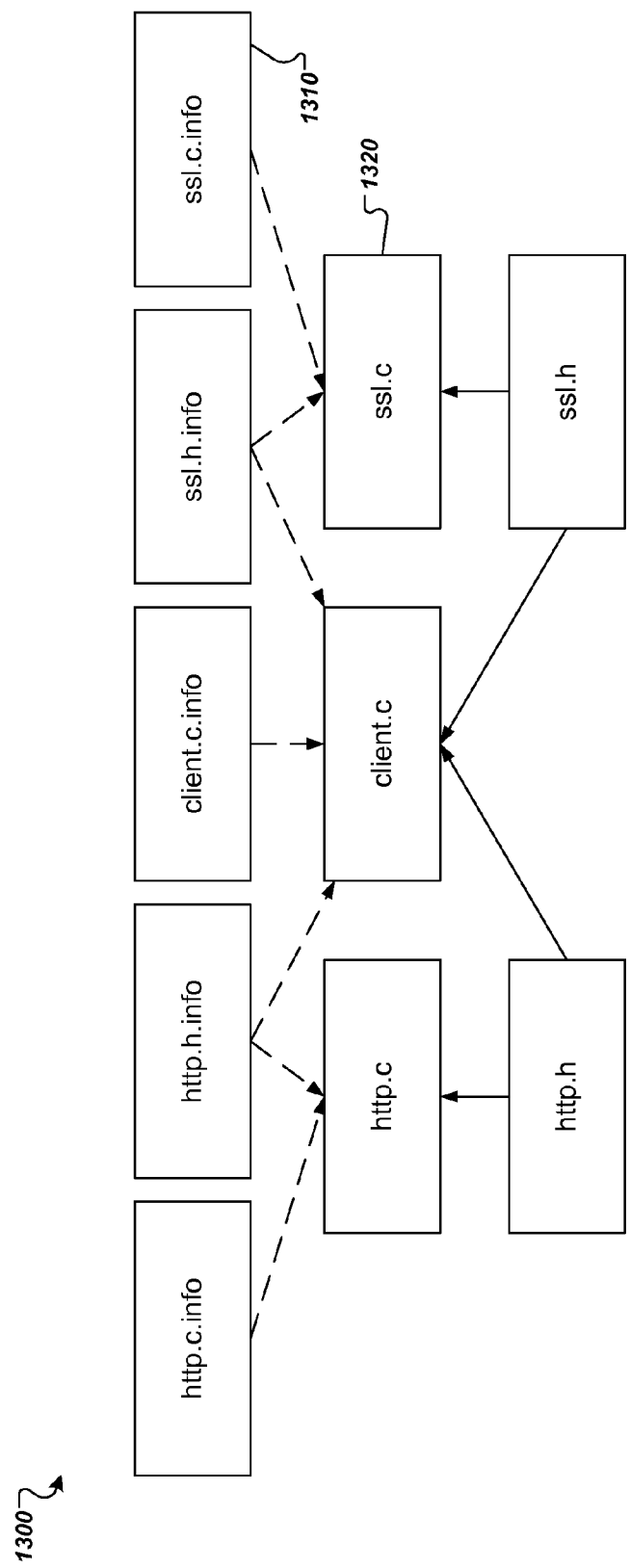
FIG. 13A illustrates a full build graph that represents the full build of the project.

FIG. 13A illustrates a full build graph 1300 that represents the full build of the project. In the build graph 1300, nodes represent source code files or information artifacts stored as information files. The full build graph 1300 represents particular relationships between files from the build as recorded in the set files for the full build. Thus, the set files include all the information represented by the full build graph 1300.

Solid arrows represent inclusion of one source code file by another source code file. For example, http.h was included by http.c and client.c. Similarly, ssl.h was included by ssl.c and client.c.

Dashed arrows represent an information file that the system generated by analyzing another source code file. Thus, the system generated http.c.info by analyzing http.c. The system will generate http.h.info by analyzing any source code file that includes http.h, e.g., http.c and client.c.

Figure 13B:
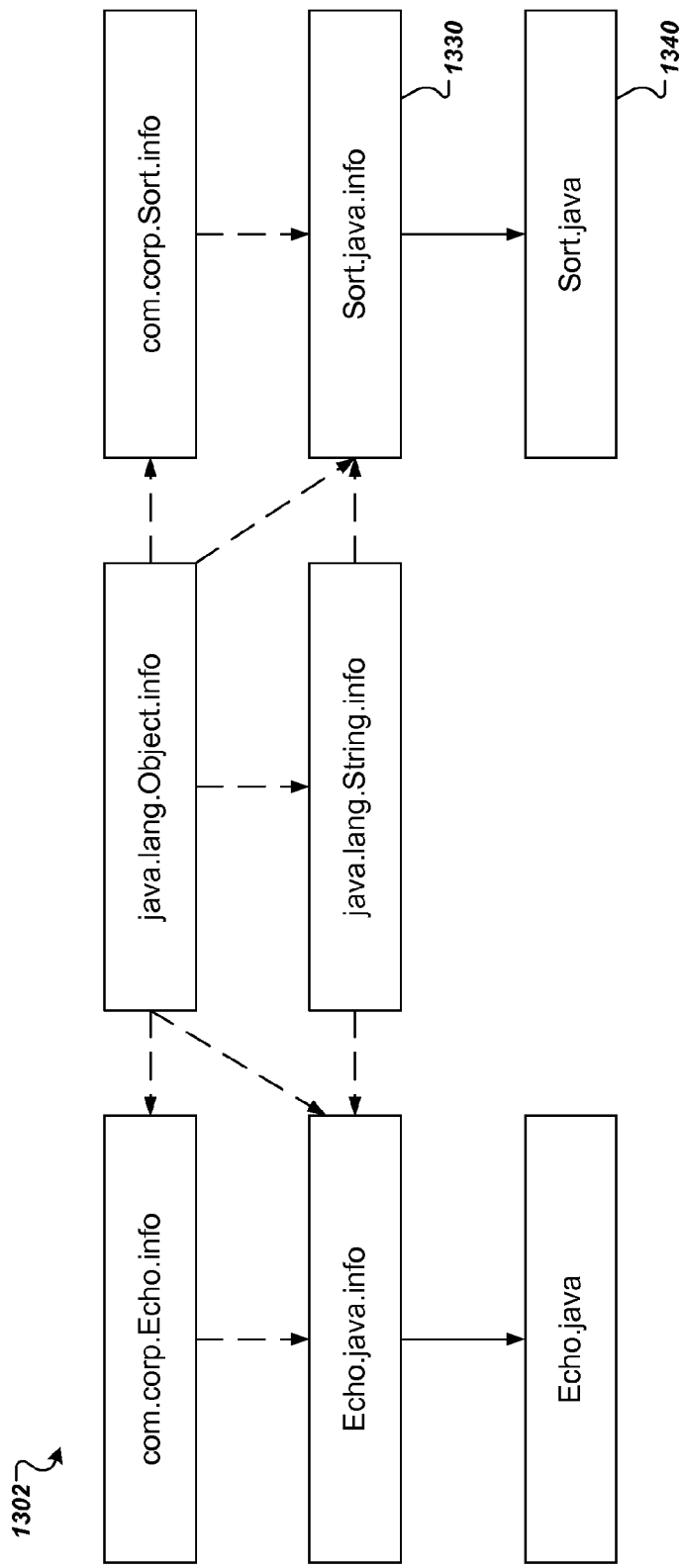
FIG. 13B illustrates a full build graph that represents a full build of a project that generates information files for each variable type.

FIG. 13B illustrates a full build graph 1302 that represents a full build of a project that generates information artifacts for each variable type. The nodes in FIG. 13B represent source code files or information artifacts stored as information files. For example, the node 1330 represents the Sort.java.info information file, and the node 1340 represents the Sort.java source code file.

The system generated the Sort.java.info file by extracting the Sort.java file. The Sort.java source code file includes three externally defined types: java.lang.String, java.lang.Object, and com.corp.Sort. The system has generated information files for each of these included types.

In FIG. 13B, a solid line represents a "generated by analyzing" relationship. Thus, the system generated Sort.java.info by analyzing the Sort.java source code file.

A dashed line represents that a class depends on a particular type. A class can depend on a particular type either because the type was used in the class definition or because the type is a supertype of a type used in the class definition.

Thus, a dashed lines exists between com.corp.Sort.info to indicate that the Sort.java class depends on the com.Corp.Sort type. A dashed line also exists between the java.lang.Object type and the com.Corp.Sort type because the java.lang.Object type is a supertype of the comp.corp.Sort type that was used in the Sort.java class.

In other words, the extractor will generate an information file for each type used in the source code files, either because they were referenced directly by one or more source code files or because a subtype of the type was referenced directly by one or more source code files.

The full build graph 1302 represents the information in set artifacts and dependency artifacts stored as the set files and dependency files shown in TABLE 2.

TABLE 2

| FILENAME | FILES INVOLVED IN EXTRACTION |
| --- | --- |
| Echo.java.set | Source |
| | Echo.java |
| | Include |
| | Info |
| | Echo.java.info |
| Sort.java.set | Source |
| | Sort.java |
| | Include |
| | Info |
| | Sort.java.info |
| Echo.java.info.dep | Info |
| | Echo.java.info |
| | Required Info |
| | com.corp.Sort.info |
| | java.lang.String.info |
| | java.lang.Object.info |
| Sort.java.info.dep | Info |
| | Sort.java.info |
| | Required Info |
| | com.corp.Sort.info |
| | java.lang.String.info |
| | java.lang.Object.info |
| com.corp.Echo.info.dep | Info |
| | com.corp.Echo.info |
| | Required Info |
| | java.lang.String.info |
| | java.lang.Object.info |
| com.corp.Sort.info.dep | Info |
| | com.corp.Sort.info |
| | Required Info |
| | java.lang.String.info |
| | java.lang.Object.info |
| java.lang.String.info.dep | Info |
| | java.lang.String.info |
| | Required Info |
| | java.lang.Object.info |

Because dependency files are used, the set files need not include all information of each of the five dependency files shown in TABLE 2.

Figure 14:
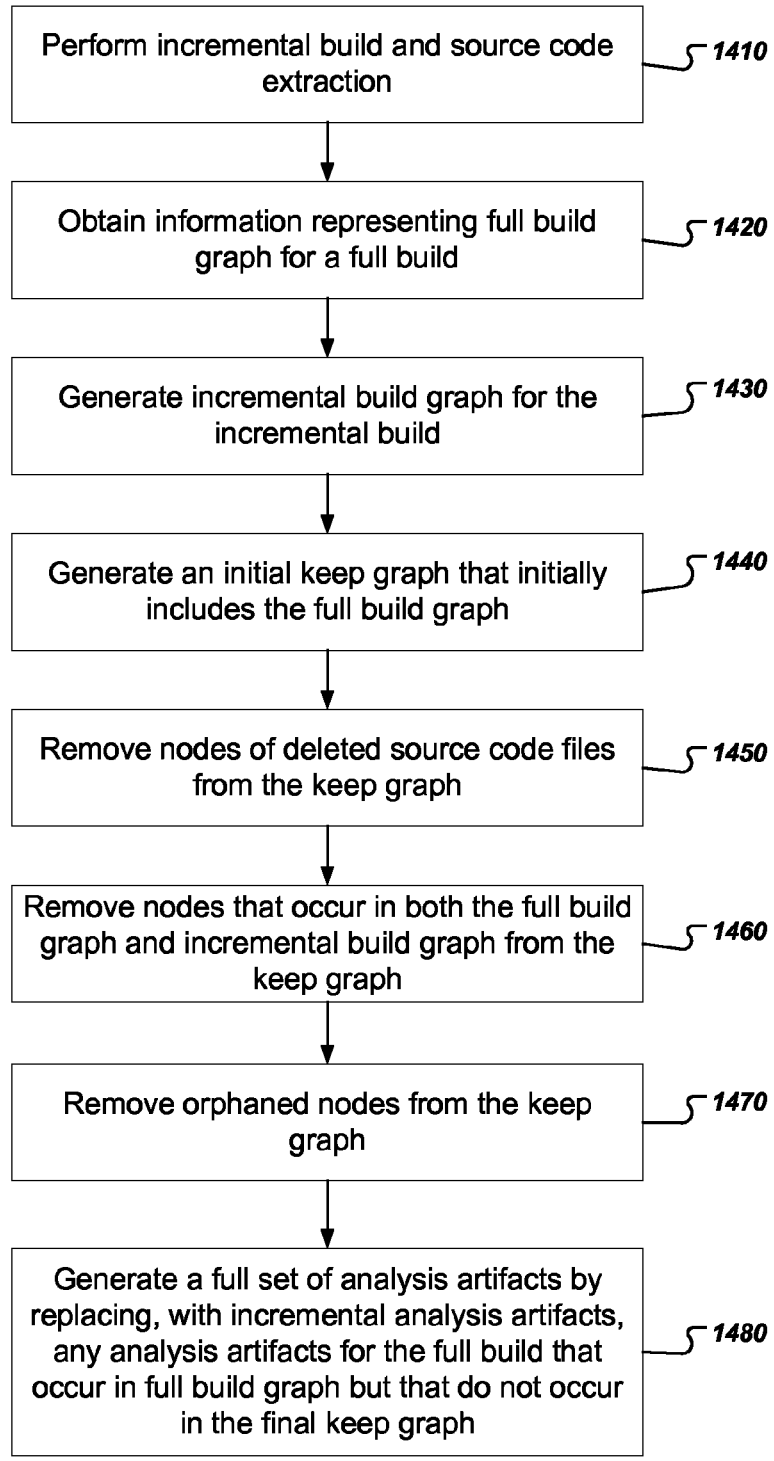
FIG. 14 is a flow chart of an example process for generating a full set of build artifacts from a set of incremental analysis artifacts.

FIG. 14 is a flow chart of an example process for generating a full set of build artifacts from a set of incremental analysis artifacts and a previous full set of build artifacts. Performing the process, the system, after performing only an incremental build, can still generate a full set of analysis artifacts. The full set of analysis artifacts will be equivalent to a set of analysis artifacts that would have been regenerated by the system after a complete rebuild of all source code in the project. The process will be described as being performed by an appropriately programmed system of one or more computers.

The system performs an incremental build and source code extraction (1410). As described above, an incremental build compiles only source code files that were changed after the last build.

For example, for the project illustrated by the dependency graph 1200 in FIG. 12, assume that the http.h file has changed since the last build. Because http.o and client.o depend on http.h, the build utility can rebuild those files using the following commands:

$ cc -o http.o http.c
$ cc -o client.o client.c
$ ld client.o http.o ssl.o -o http_client Thus, the build system can perform an incremental build without using ssl.c and without rebuilding ssl.o.

During the incremental build, the system will generate set artifacts, which may be stored as the set files shown in TABLE 3. Although some of the set files in TABLE 3 have the same name as the set files shown in TABLE 1, the system will maintain both versions of each file. The system can maintain both versions in any appropriate way, e.g., by placing each version in a separate file system directory.

TABLE 3

| FILENAME | FILES INVOLVED IN EXTRACTION |
|---|---|
| http.c.set | Source |
| | http.c |
| | Include |
| | http.h |
| | Info |
| | http.c.info, |
| | http.h.info |
| client.c.set | Source |
| | client.c |
| | Include |
| | http.h |
| | ssl.h |
| | Info |
| | client.c.info, |
| | http.h.info |
| | ssl.h.info |

The system obtains information representing a full build graph for a full build (1420). For example, the system can obtain the set files among the analysis artifacts for a most recent full build of a previous snapshot of the code base. The set files for the full build include data representing all of the relationships of the full build graph for the full build.

In this example, the full build graph is represented by information in set files only. However, the full build graph may also be represented by information in set artifacts as well as dependency artifacts, described above in reference to FIG. 13.

The system generates an incremental build graph for the incremental build (1430). The incremental build graph can be generated from the set files generated during the incremental build, for example, as shown in TABLE 3.

Figure 15:
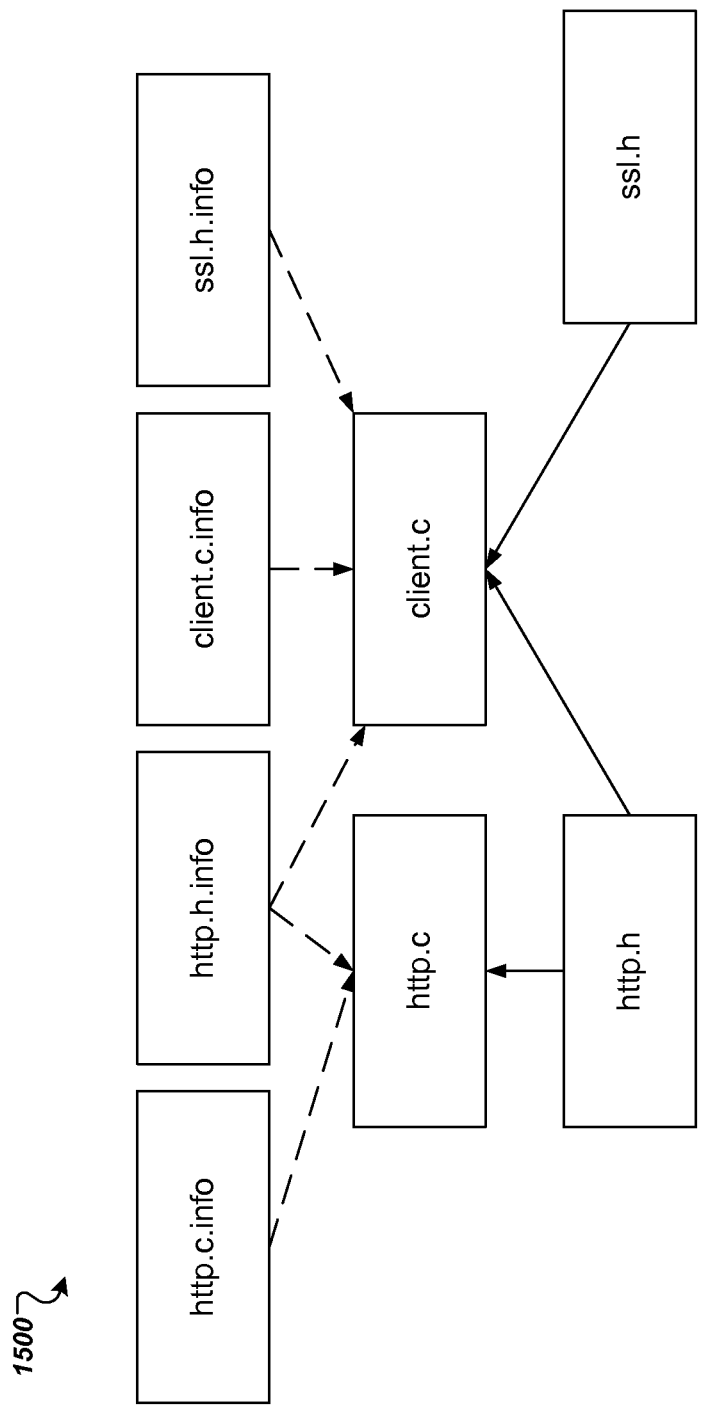
FIG. 15 illustrates an incremental build graph that represents the incremental build of the project.

FIG. 15 illustrates an incremental build graph 1500 that represents the incremental build of the project. The incremental build graph 1500 represents the information in the set files generated during the incremental build. An incremental build graph may also be represented by information in dependency artifacts, described above in reference in FIG. 13.

The incremental build graph 1500 has many of the same nodes and relationships as the full build graph 1300. However, some nodes and relationships are absent. In particular, the ssl.c.info node 1310 and the ssl.c node 1320 that occurred in the full build graph 1300 are both absent from the incremental build graph 1500. Also absent from the incremental build graph 1500 are any links that connected the ssl.c.info node 1310 and the ssl.c node 1320 in the full build graph 1300.

As shown in FIG. 14, the system generates an initial keep graph that includes the full build graph (1440). The system can remove nodes from the initial keep graph in a particular order to generate a final keep graph. The final keep graph will eventually represent all source code files and analysis artifacts that are already up to date and that do not need to be deleted, reanalyzed, or regenerated in light of the incremental analysis.

The system removes any nodes of deleted source code files from the keep graph (1450). If any source code files that were part of the full build were deleted at the time of the incremental build, the system removes nodes representing those deleted source code files from the keep graph.

The system removes any nodes that occur in both the full build graph and the incremental build graph from the keep graph (1460). The system can consider all nodes in the incremental build graph and remove, from the keep graph, corresponding nodes that also occur in the full build graph.

Because the keep graph is initialized as the full build graph, the system can also compare the keep graph and the incremental build graph, removing nodes from the keep graph that also occur in the incremental build graph.

The system removes any orphaned nodes from the keep graph (1470). An orphaned node can occur, for example, when a header file is no longer necessary, because it was only included by a source file that has now been deleted.

Since the source code file has been deleted, the system will remove the corresponding node from the keep graph as described in the previous step. Doing so will orphan the node for the header file in the keep graph. Thus, the system can remove the node for the header file from the keep graph.

Figure 16:
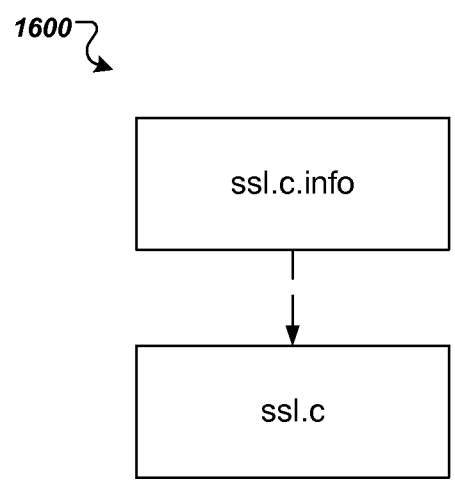
FIG. 16 illustrates an example keep graph.

FIG. 16 illustrates an example final keep graph 1600. The keep graph 1600 includes nodes for the ssl.c.info file and the ssl.c file. The occurrence in the keep graph 1600 of the node for the information file ssl.c.info represents that the ssl.c.info file need not be regenerated for the incremental build. The occurrence in the keep graph 1600 of the node for the ssl.c file represents that the ssl.c file need not be reanalyzed for the incremental build.

As shown in FIG. 14, he system generates a full set of analysis artifacts by replacing, with incremental analysis artifacts, any analysis artifacts for the full build that occur in the full build graph but that do not occur in the keep graph (1480). For example, the only analysis artifact in the keep graph 1600 is ssl.c.info. Thus, the system can generate a full set of analysis artifacts by replacing all other analysis artifacts with the incremental analysis artifacts generated during the incremental build. This includes any information artifacts, set artifacts, and dependency artifacts generated during the incremental build.

The system may maintain separate file system directories to simplify the replacement process. For example, the system can maintain the full set of analysis artifacts in a full analysis directory and the incremental analysis artifacts in an incremental analysis directory.

The system can then perform the replacement by first deleting from the full analysis directory all artifacts that are represented by nodes in the full build graph but not in the final keep build graph. The system can then copy, to the full analysis directory, all incremental analysis artifacts from the incremental analysis directory. The system can then also copy, to the incremental analysis directory, all analysis artifacts from the full analysis directory. The system will then effectively have two directories that each contain a set of analysis artifacts that is equivalent to a full set of analysis artifacts that would have been generated from a complete rebuild and reanalysis of all source code in the project.

If the system performs a subsequent, second incremental build, the system can use the newly generated full set of analysis artifacts as a representation of the full build of the system. Thus, the system can generate the full build graph as described above using the newly generated full set of analysis artifacts.

In this way, the system can repeatedly perform incremental analysis of source code in the code base for an arbitrary number of incremental builds, and the system can always have an accurate and full set of analysis artifacts. For each incremental analysis performed, the system can use the example process outlined above to generate a full set of analysis artifacts that are equivalent to the analysis artifacts that would have been generated had the system completely rebuilt all the source code of the code base, rather than performing one or more incremental builds.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, subprograms, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CDROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving a first full set of analysis artifacts representing properties of source code files compiled during a full build of a first snapshot of a project;
   receiving data representing a full build graph, the full build graph representing relationships between the source code files compiled during the full build of the first snapshot of the project and the first full set of analysis artifacts;
   performing an incremental analysis of source code files compiled during an incremental build of a second, subsequent snapshot of the project, including analyzing source code files that have changed between the first snapshot and the second snapshot;
   receiving an incremental set of analysis artifacts representing properties of source code files compiled during the incremental build of the second snapshot of the project;
   receiving data representing an incremental build graph, the incremental build graph representing relationships between the source code files compiled during the incremental build of the second snapshot of the project and the incremental set of analysis artifacts;
   generating an initial keep graph that is initially equivalent to the full build graph;
   removing, from the initial keep graph, any nodes representing source code files or analysis artifacts that also occur in the incremental build graph;
   deleting, from the first full set of analysis artifacts, analysis artifacts for source code files represented by nodes that occur in the full build graph but that do not occur in the keep graph; and
   copying the analysis artifacts represented by nodes in the incremental build graph into the first full set of analysis artifacts to generate a second full set of analysis artifacts for the project.

2. The method of claim 1, wherein the full build graph includes source code file nodes representing the source code files compiled during the full build, analysis artifact nodes representing the analysis artifacts generated for the source code files during the full build, first edges between source code file nodes that represent source code inclusion of one source code file by another, and second edges between analysis artifact nodes and source code file nodes that represent an analysis artifact generated for a source code file, and
   wherein the incremental build graph includes source code file nodes representing the source code files compiled during the incremental build, analysis artifact nodes representing the analysis artifacts generated for the source code files during the incremental build, first edges between source code file nodes that represent source code inclusion of one source code file by another, and second edges between analysis artifact nodes and source code file nodes that represent an analysis artifact generated for a source code file.

3. The method of claim 1, further comprising:
   removing, from the keep graph, any source code file nodes representing source code files that were deleted between the first snapshot and the second snapshot.

4. The method of claim 1, further comprising:
   removing, from the keep graph, any orphaned nodes that do not have an edge to at least one source code file node.

5. The method of claim 1, wherein the data representing the full build graph and incremental build graph comprises a set artifact for every source code file compiled by a full build or an incremental build, wherein the set artifact includes data representing each source code file that was compiled and any headers that were imported by the source code file that was compiled.

6. The method of claim 1, wherein the data representing the full build graph and the incremental build graph comprises a dependency artifact for information artifacts that depend on other information artifacts.

7. The method of claim 6, wherein each information artifact that depends on another information artifact represents a distinct variable type.

8. The method of claim 1, wherein each set artifact includes data representing analysis artifacts generated by a static analysis system during the full analysis or the incremental analysis.

9. The method of claim 1, wherein copying the incremental artifacts represented by nodes in the incremental build graph into the full set of analysis artifacts comprises:
    copying all incremental artifacts from a first directory corresponding to the incremental analysis to a second directory including the full set of analysis artifacts corresponding to the full analysis.

10. The method of claim 9, further comprising copying the full set of analysis artifacts in the second directory to the first directory.

11. The method of claim 1, further comprising:
    receiving data representing a subsequent incremental build graph, the subsequent incremental build graph representing source code files compiled and analysis artifacts generated during an incremental analysis of a third snapshot of the project; and
    generating a third full set of analysis artifacts for the project including comparing the subsequent incremental build graph to a second full build graph generated using the second full set of analysis artifacts for the project.

12. The method of claim 11, wherein generating a third full set of analysis artifacts for the project comprises:
    generating a second initial keep graph that is initially equivalent to the second full build graph;
    removing, from the second initial keep graph, any source code file nodes or analysis artifact nodes that occur in the subsequent incremental build graph; and
    deleting, from the second full set of analysis artifacts, analysis artifacts for source code files represented by nodes that occur in the second full build graph but that do not occur in the second keep graph; and
    copying analysis artifacts represented by analysis artifact nodes in the incremental build graph into the second full set of analysis artifacts to generate the third full set of analysis artifacts for the project.

13. A system comprising:
    one or more computers and one or more storage devices storing instructions that are operable, when executed by the one or more computers, to cause the one or more computers to perform operations comprising:
    receiving a first full set of analysis artifacts representing properties of source code files compiled during a full build of a first snapshot of a project;
    receiving data representing a full build graph, the full build graph representing relationships between the source code files compiled during the full build of the first snapshot of the project and the first full set of analysis artifacts;
    performing an incremental analysis of source code files compiled during an incremental build of a second, subsequent snapshot of the project, including analyzing source code files that have changed between the first snapshot and the second snapshot;
    receiving an incremental set of analysis artifacts representing properties of source code files compiled during the incremental build of the second snapshot of the project;
    receiving data representing an incremental build graph, the incremental build graph representing relationships between the source code files compiled during the incremental build of the second snapshot of the project and the incremental set of analysis artifacts;
    generating an initial keep graph that is initially equivalent to the full build graph;
    removing, from the initial keep graph, any nodes representing source code files or analysis artifacts that also occur in the incremental build graph;
    deleting, from the first full set of analysis artifacts, analysis artifacts for source code files represented by nodes that occur in the full build graph but that do not occur in the keep graph; and
    copying the analysis artifacts represented by nodes in the incremental build graph into the first full set of analysis artifacts to generate a second full set of analysis artifacts for the project.

14. The system of claim 13, wherein the full build graph includes source code file nodes representing the source code files compiled during the full build, analysis artifact nodes representing the analysis artifacts generated for the source code files during the full build, first edges between source code file nodes that represent source code inclusion of one source code file by another, and second edges between analysis artifact nodes and source code file nodes that represent an analysis artifact generated for a source code file, and
    wherein the incremental build graph includes source code file nodes representing the source code files compiled during the incremental build, analysis artifact nodes representing the analysis artifacts generated for the source code files during the incremental build, first edges between source code file nodes that represent source code inclusion of one source code file by another, and second edges between analysis artifact nodes and source code file nodes that represent an analysis artifact generated for a source code file.

15. The system of claim 13, wherein the operations further comprise:
    removing, from the keep graph, any source code file nodes representing source code files that were deleted between the first snapshot and the second snapshot.

16. The system of claim 13, wherein the operations further comprise:
    removing, from the keep graph, any orphaned nodes that do not have an edge to at least one source code file node.

17. The system of claim 13, wherein the data representing the full build graph and incremental build graph comprises a set artifact for every source code file compiled by a full build or an incremental build, wherein the set artifact includes data representing each source code file that was compiled and any headers that were imported by the source code file that was compiled.

18. The system of claim 13, wherein the data representing the full build graph and the incremental build graph comprises a dependency artifact for information artifacts that depend on other information artifacts.

19. The system of claim 18, wherein each information artifact that depends on another information artifact represents a distinct variable type.

20. The system of claim 13, wherein each set artifact includes data representing analysis artifacts generated by a static analysis system during the full analysis or the incremental analysis.

21. The system of claim 13, wherein copying the incremental artifacts represented by nodes in the incremental build graph into the full set of analysis artifacts comprises:
copying all incremental artifacts from a first directory corresponding to the incremental analysis to a second directory including the full set of analysis artifacts corresponding to the full analysis.

22. The system of claim 21, wherein the operations further comprise copying the full set of analysis artifacts in the second directory to the first directory.

23. The system of claim 13, wherein the operations further comprise:
receiving data representing a subsequent incremental build graph, the subsequent incremental build graph representing source code files compiled and analysis artifacts generated during an incremental analysis of a third snapshot of the project; and
generating a third full set of analysis artifacts for the project including comparing the subsequent incremental build graph to a second full build graph generated using the second full set of analysis artifacts for the project.

24. The system of claim 23, wherein generating a third full set of analysis artifacts for the project comprises:
generating a second initial keep graph that is initially equivalent to the second full build graph;
removing, from the second initial keep graph, any source code file nodes or analysis artifact nodes that occur in the subsequent incremental build graph; and
deleting, from the second full set of analysis artifacts, analysis artifacts for source code files represented by nodes that occur in the second full build graph but that do not occur in the second keep graph; and
copying analysis artifacts represented by analysis artifact nodes in the incremental build graph into the second full set of analysis artifacts to generate the third full set of analysis artifacts for the project.

25. A computer program product, encoded on one or more non-transitory computer storage media, comprising instructions that when executed by one or more computers cause the one or more computers to perform operations comprising:
receiving a first full set of analysis artifacts representing properties of source code files compiled during a full build of a first snapshot of a project;
receiving data representing a full build graph, the full build graph representing relationships between the source code files compiled during the full build of the first snapshot of the project and the first full set of analysis artifacts;
performing an incremental analysis of source code files compiled during an incremental build of a second, subsequent snapshot of the project, including analyzing source code files that have changed between the first snapshot and the second snapshot;
receiving an incremental set of analysis artifacts representing properties of source code files compiled during the incremental build of the second snapshot of the project;
receiving data representing an incremental build graph, the incremental build graph representing relationships between the source code files compiled during the incremental build of the second snapshot of the project and the incremental set of analysis artifacts;
generating an initial keep graph that is initially equivalent to the full build graph;
removing, from the initial keep graph, any nodes representing source code files or analysis artifacts that also occur in the incremental build graph;
deleting, from the first full set of analysis artifacts, analysis artifacts for source code files represented by nodes that occur in the full build graph but that do not occur in the keep graph; and
copying the analysis artifacts represented by nodes in the incremental build graph into the first full set of analysis artifacts to generate a second full set of analysis artifacts for the project.

26. The computer program product of claim 25, wherein the full build graph includes source code file nodes representing the source code files compiled during the full build, analysis artifact nodes representing the analysis artifacts generated for the source code files during the full build, first edges between source code file nodes that represent source code inclusion of one source code file by another, and second edges between analysis artifact nodes and source code file nodes that represent an analysis artifact generated for a source code file, and
wherein the incremental build graph includes source code file nodes representing the source code files compiled during the incremental build, analysis artifact nodes representing the analysis artifacts generated for the source code files during the incremental build, first edges between source code file nodes that represent source code inclusion of one source code file by another, and second edges between analysis artifact nodes and source code file nodes that represent an analysis artifact generated for a source code file.

27. The computer program product of claim 25, wherein the operations further comprise:
removing, from the keep graph, any source code file nodes representing source code files that were deleted between the first snapshot and the second snapshot.

28. The computer program product of claim 25, wherein the operations further comprise:
removing, from the keep graph, any orphaned nodes that do not have an edge to at least one source code file node.

* * * * *